United States Patent

Milner

[11] Patent Number: 5,880,886
[45] Date of Patent: Mar. 9, 1999

[54] OPTICAL COMPONENT SUITABLE FOR USE IN GLAZING

[76] Inventor: Peter James Milner, 8 Juliet Close, Nuneaton, United Kingdom, CV11 6NS

[21] Appl. No.: 537,821
[22] PCT Filed: May 3, 1994
[86] PCT No.: PCT/GB94/00949
  § 371 Date: Nov. 3, 1995
  § 102(e) Date: Nov. 3, 1995
[87] PCT Pub. No.: WO94/25792
  PCT Pub. Date: Nov. 10, 1994

[30] Foreign Application Priority Data

| May 4, 1993 | [GB] | United Kingdom | 9309284 |
| Jun. 8, 1993 | [GB] | United Kingdom | 9311759 |
| Mar. 26, 1994 | [GB] | United Kingdom | 9406076 |

[51] Int. Cl.$^6$ ............ G02B 5/02; G02B 17/00; G02B 27/00
[52] U.S. Cl. ............ 359/599; 359/592; 359/593; 359/594; 359/595; 359/597; 359/598; 359/613; 359/837
[58] Field of Search .................... 359/599, 592, 359/593, 594, 595, 597, 598, 613, 837

[56] References Cited

U.S. PATENT DOCUMENTS

| 720,386 | 2/1903 | Wadsworth et al. | 359/593 |
| 2,546,335 | 3/1951 | Friend | 359/596 |
| 4,634,222 | 1/1987 | Critten | 359/596 |
| 4,699,467 | 10/1987 | Bartenbach | 359/592 |

FOREIGN PATENT DOCUMENTS

| 24711/88 | 5/1990 | Australia. | |
| 8137 | 3/1900 | United Kingdom | 359/593 |
| 287729 | 3/1928 | United Kingdom. | |
| 2220025 | 12/1989 | United Kingdom. | |

*Primary Examiner*—Cassandra C. Spyrou
*Assistant Examiner*—Mohammad Y. Sikder
*Attorney, Agent, or Firm*—Gifford, Krass, Groh, Sprinkle, Patmore, Anderson & Citkowski, P.C.

[57] ABSTRACT

An optical component comprises at least one substantially planar element having a plurality of elementary surfaces capable of acting to reflect by total internal reflection light incident thereon through the corresponding said element within a first range of incident angles associated with each surface, and to refract light incident thereon through the corresponding said element within a second range of incident angles associated with each surface. Refracted light at low angles of incidence passes straight through to provide a view through the component.

42 Claims, 26 Drawing Sheets

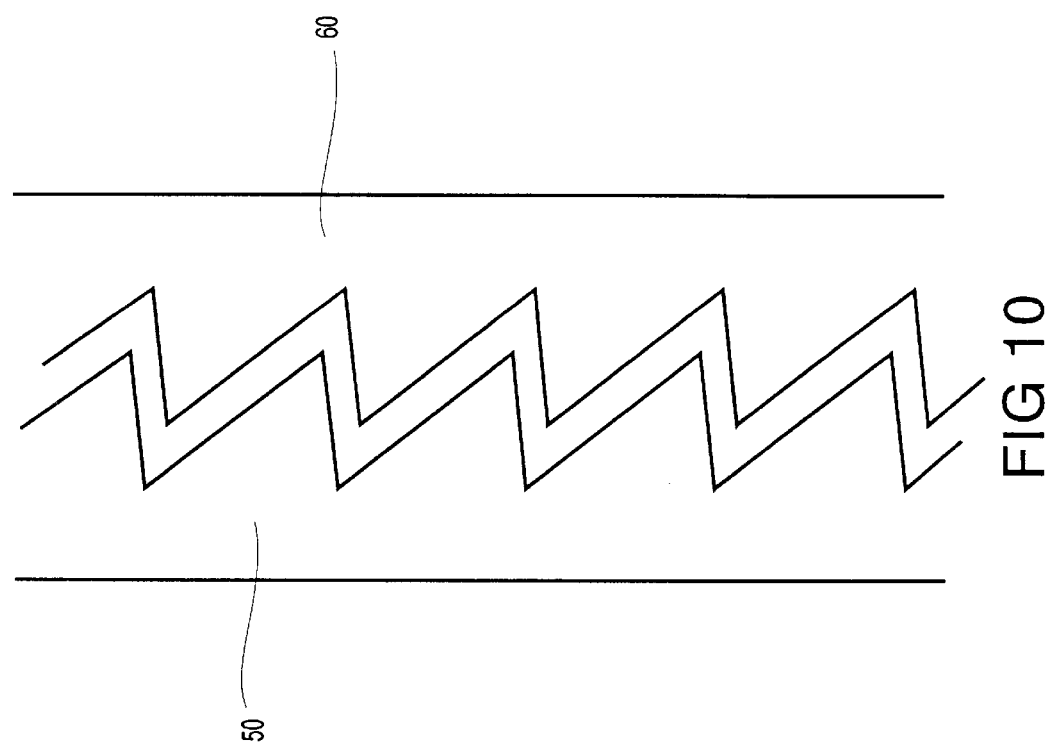

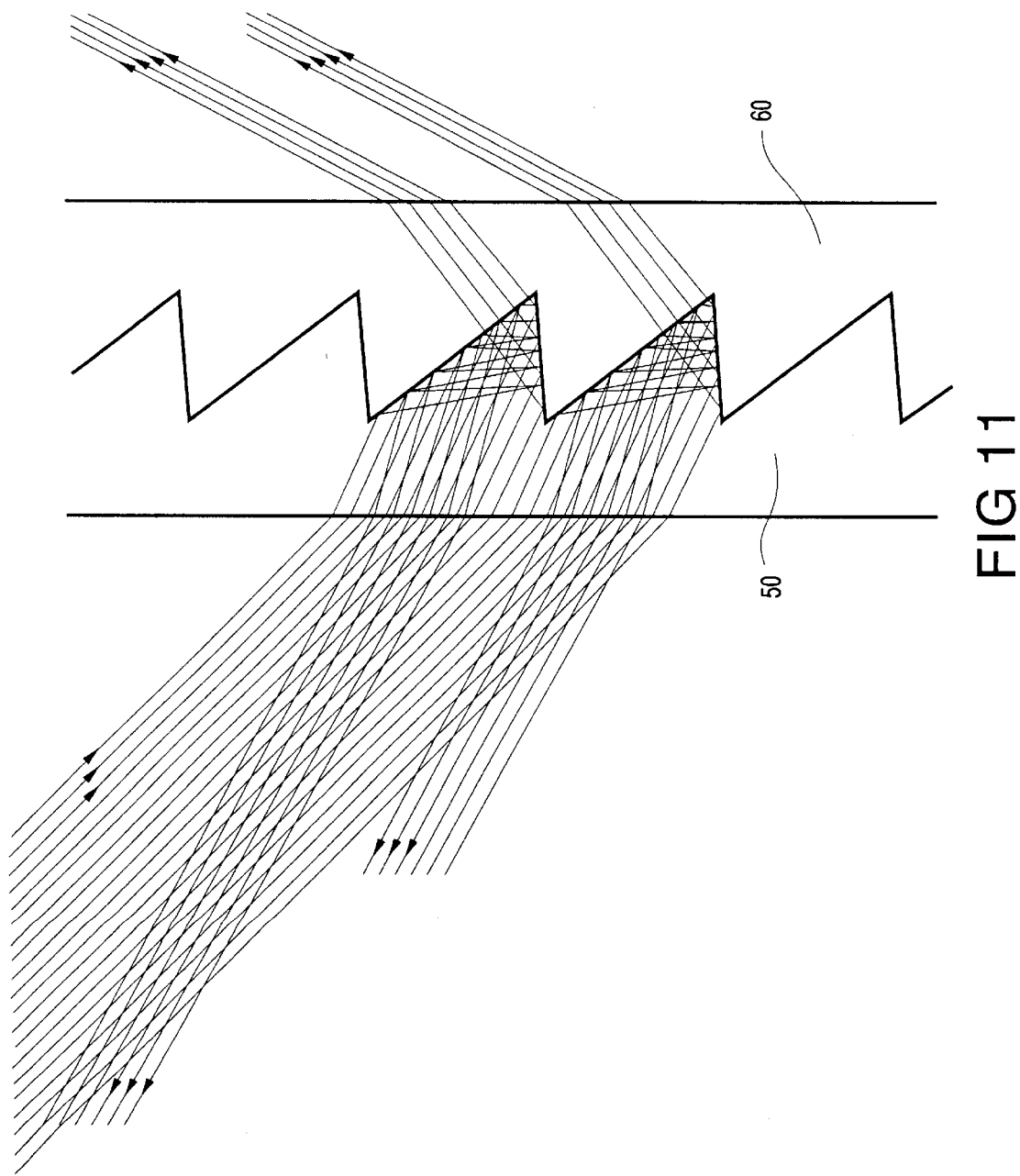

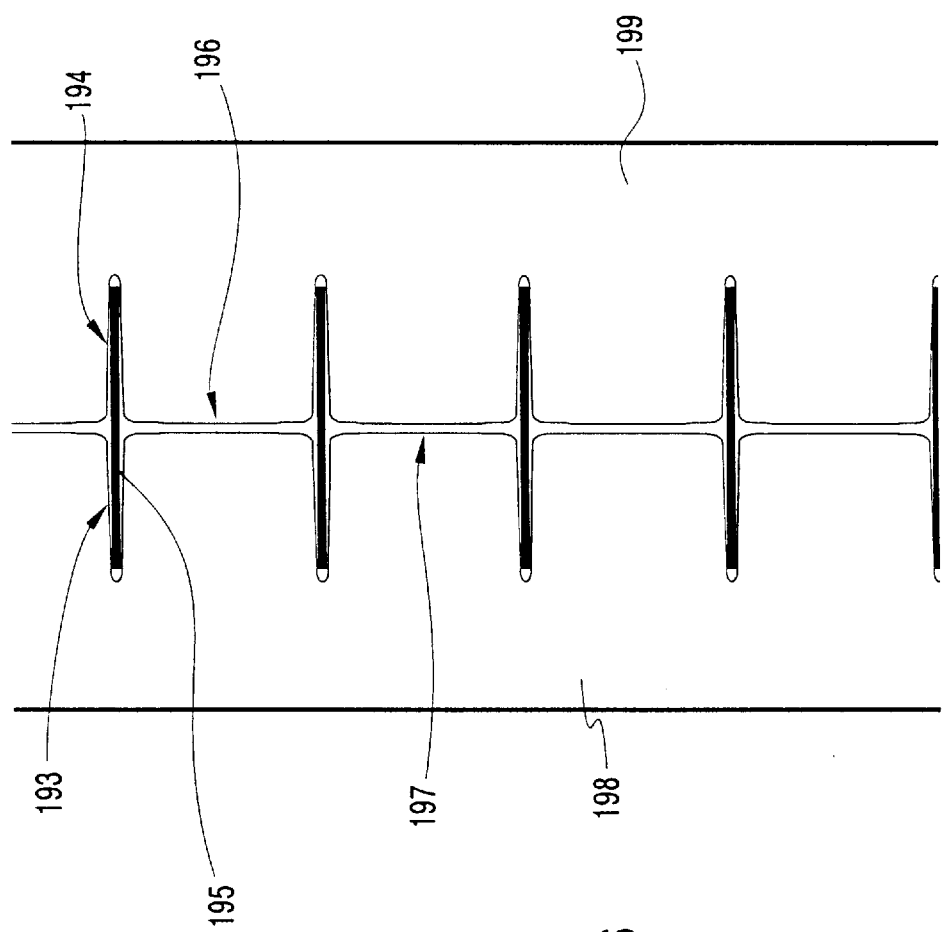

OPTICAL COMPONENT SUITABLE FOR USE IN GLAZING

BACKGROUND OF THE INVENTION

The present invention relates generally to an optical component suitable for use in glazing, and in particular in glazing openings in fixed structures such as commercial, industrial or domestic buildings. The present invention will hereinafter be described with specific reference to its application to such fixed structures without prejudice to the generality of the invention, however, which may nevertheless be used in other applications where its characteristic optical features may be found to be of utility. In particular, this may include, without limitation, glazing for openings in vehicles, or for covering the exit opening of light sources or light transmission devices.

It is known that the intensity of illumination provided by daylight increases generally with higher angles of elevation of incident light. This may be influenced on clear days by direct sunlight, in which case the peak intensity may lie at a lower angle in dependence on the elevation of the sun. For this reason the illumination within a building by daylight entering through window or other openings is recognised to have greatest intensity closest to and immediately beneath the window opening, and to reduce in intensity with an increase in distance from the window. For the purposes of the present specification the term "window" will be understood to refer to any opening in a vertical or near-vertical (that is upright) wall or facade, whilst an opening in a horizontal or inclined surface will be termed a roof light.

For most commercial buildings where the occupants are expected to be working on horizontal surfaces such as desks or tables, it has become conventional for the majority, if not all of the external surfaces to be formed as glazed window openings apart from any essential structural components required to support the glazing. Buildings having a depth greater than that which can be illuminated even from totally glazed outside walls require permanent artificial lighting. This, however, constitutes a considerable consumption of energy, and it has been established that the energy consumption within large office blocks for illumination is in general greater than the energy consumption for heating in winter and/or cooling in summer.

The problem of glare is also encountered in such buildings, and this is generally approached by use of physical barriers such as blinds, whilst excess thermal input is approached by the use of optical coatings and/or air conditioning both of which can be adjusted to suit the immediate environmental conditions.

The present invention seeks to address the above problems by providing an optical component suitable for use as part of, or in association with, a glazing panel across an opening in a structure which will act to direct incident light into the building in such a way that it is more uniformly distributed through the interior.

Known so-called "daylighting" systems for improving the interior illumination through glazed windows act to divert incident light at high elevations by reflection at silvered surfaces so that the light is directed into the interior of the building at a higher angle of elevation than it would if transmitted through a conventional window pane where, by falling on a horizontal surface close to the window (which typically would not have a high degree of reflectivity), it is absorbed and therefore not available for use. One known such system also includes pivoted reflectors capable of being orientated such as to divert direct sunlight away from the building in order to reduce glare. Known such systems have the significant disadvantage that the reflecting surfaces act as a barrier to direct viewing through the windows and, therefore, although the distribution of daylight within the interior is improved the improvement is obtained only at the expense of a loss or reduction in visibility through the windows.

The present invention seeks to provide an optical component which, when used to enhance the illumination by daylight within a building interior, nevertheless allows those inside the building to obtain an almost normal, undistorted view through the window.

SUMMARY OF THE INVENTION

According to one aspect of the present invention, an optical component comprises two substantially planar elements each having a respective plurality of elementary surfaces capable of acting to reflect by total internal reflection light incident thereon through the corresponding said element within a first range of incident angles associated with each surface, and to refract light incident thereon through the corresponding said element within a second range of incident angles associated with each surface.

Elementary surfaces on each element may have the same form, a similar form, or may be different from one another.

In one embodiment of the invention the at least one optical element has a generally planar form with two opposite major faces and a plurality of regular surface formations on the face, opposite the said one face, from which light exits in use, the said surface formations acting to divert light passing through the component by refraction and reflection into the said two different directions.

The said elementary surfaces may include reflector interfaces at which reflection occurs. The elementary surfaces may be regular and uniform or may be non-uniform such that, for a given angle of incidence, the angle of reflection is different at different points of incidence over the surface of the component. This may assist in avoiding glare as will be described in more detail below.

For example, if for a given angle of incidence, the angle of reflection is greater at points of incidence closer to a lower edge of the component in relation to a normal upright orientation of use, than at points of incidence further from the said lower edge, this serves not only to spread the reflected light over a wider angle, therefore minimising the potential for an observer to be dazzled by a concentration of light in one direction (namely, that arriving from the solar disc) but also has other benefits in avoiding "hot spots" of illumination as will be discussed below.

The reflector interfaces may be planar, and set at different inclinations (either progressively or irregularly) to achieve the required spread, or may be curved either convexly or concavely.

In a preferred embodiment of the invention suitable for use in glazing applications the elementary surfaces are formed as asperities which interpenetrate one another; that is, the asperities of one element interpenetrate the corresponding asperities of the other element.

At least some of the elementary surfaces of the two said elements may touch one another, either by direct contact or via an adhesive or interstitial medium such as water or a gel. The medium may have the same refractive index as the material of the elements, or a different refractive index, and the choice of these values will affect the optical behaviour of the component.

In a preferred embodiment of the invention each element has two sets of elementary surfaces formed as elongate planar faces inclined to one another to define parallel V-section grooves in a major face of the element. The grooves may be separated from one another or may be contiguous.

In other embodiments the grooves may be defined by a number of surface elements greater than two. For example two or more surface elements may define one side of a groove. Of course, the surface elements are not necessarily planar, and curvilinear surface elements may also be utilised. The curvature of such elements may be simple curvature in one plane (which may be orthogonal to or parallel to the major face of the planar element, or may be a compound curve both parallel to and orthogonal to the said major face.

By appropriately selecting the aspect ratio (that is the ratio between the depth and width) of the grooves, together with an appropriate choice of separation between adjacent grooves, it can be arranged that the visibility through an optical component formed as an embodiment of the invention is substantially unobstructed over the range of angles subtended at the eye of an observer for which the field of view of interest lies. In other words, it is appreciated that the field of view of interest through a window for a seated or standing observer lies on either side of a horizontal plane such as to subtend an angle at the eye of the observer approximately in the region of ±15°. Above 15° the majority of the image is sky which, for the most part, is not observed in detail by the occupants of a room.

In order that the view through the component shall be undistorted it is important that the two major faces each have at least a proportion of their respective surface area substantially parallel to one another: in such an embodiment the elementary surfaces acting to divert incident light into two separate directions thus occupy a proportion (and preferably a minor proportion) of the overall surface area of the component.

The elementary surfaces may be symmetrical or asymmetrical in cross section and the arrangement may be such that at least over certain angles of incidence, light is reflected by the component rather than being transmitted therethrough, although at other angles of incidence light may be both reflected and transmitted.

Specific embodiments of the invention may be formed with cooperating interfaces acting to provide a plane reflector effect.

Between cooperating elementary surfaces there may be void spaces which may contain any selected fluid such as air, gas, or a liquid of selected refractive index, and the component may have means by which the contents of the void spaces may be changed whereby to change the effective optical performance by varying the refractive index of the material in the void spaces.

Embodiments of the present invention may be made by micro-replication techniques utilising plastics film material which may be self-supporting or may require support on a transparent substrate such as glass, whereas other embodiments of the invention may be formed directly from a self-supporting material such as glass.

In either case the elementary surfaces may be formed as the faces of grooves in a major face of the element, and the grooves may be formed by the use of a forming tool or other former, and in certain cases which will be described hereinbelow, the formers may be left in place since the total internal reflection at the interfaces defined by the formers effectively ensures that these are "invisible".

The grooves of cooperating elements, which grooves define the elementary surfaces referred to above, may be in register with one another across the interface between the two elements, or may be out of register by a predetermined phase, and may be symmetrical or asymmetrical according to the function the optical component is required to perform.

Another embodiment of the invention is formed to be able to act also as a sun blind, in which there are further provided means for diverting a proportion of light incident on the said one face in such a way that it travels away from the component on the same side thereof as the said one face.

The elements comprising an optical component formed as an embodiment of the present invention may be monolithic elements and the component may be supported on at least one face thereof by a substantially rigid planar transparent panel. The optical component may alternatively be supported on two opposite faces by respective substantially rigid planar transparent panels.

In an optical component formed as an embodiment of the present invention the surface formations may give rise to one or a plurality of chambers within the component, which may be infused by different fluids to change the optical characteristics of the panel. This may allow the panel to be adapted to take account of changing environmental conditions, and in particular to switch in a sun blind effect by appropriately varying the refractive index of the material within the chambers. This will be described in more detail hereinbelow with reference to the specific embodiments.

The composite glazing panel may be adapted to be fitted as an auxiliary element to an existing glazing structure of a building, or may be adapted to constitute a glazing element of a permanent glazing structure of a building. The panel may, when fitted, be fixed in its orientation, or may be incorporated in a support structure enabling the orientation and/or position of the panel to be varied selectively.

According to a further aspect of the present invention, an optical component comprises at least one planar element having a plurality of elementary surfaces inclined to a major face thereof, in which the dimensions of and separation between the elementary surface elements are not substantially larger than about the pupil of the human eye (1 mm) and not smaller than that at which diffraction effects predominate (about several micrometers).

Various embodiments of the present invention will now be more particularly described, by way of example, with reference to the accompanying drawings.

BRIEF DESCRIPTION OF THE DRAWINGS

FIG. 10 is a schematic view of another embodiment of the invention utilising partly silvered reflectors;

FIG. 11 is an expanded view, not to scale, of the embodiment of FIG. 10 for the purposes of explanation;

FIG. 26 is a sectional side view of an embodiment made using a plurality of formers.

DESCRIPTION OF THE PREFERRED EMBODIMENTS

Figure 1:
FIG. 1 is a schematic diagram illustrating the variation in intensity of light incident in a room through a conventional window.

Referring now to the drawings FIG. 1 illustrates the distribution of light within a room generally indicated by the box 11 passing through a window generally indicated 12 by daylight generally indicated 13 passing therethrough. For the purpose of illustration daylight passing through only a single point in the window has been illustrated, and for illustrative purposes the light has been represented by bundles of rays with the number of rays in each bundle being representative of the intensity of daylight from that range of directions. Thus, it will be seen that at a relatively low angle of elevation the bundle indicated 13a has only three rays, indicating a low intensity, whilst progressively at higher elevations the bundles indicated for example 13f, 13g and 13h have many more rays. The intensity of illumination from the notional bundles of light rays 13a–13h has been illustrated by the letters a–h along the floor and internal wall of the room 11, where the intensity of illumination is represented by the closeness of spacing of the incident rays. For comparison purposes it has been supposed that a table 14 is placed within the room 11 at a fixed position spaced from the window 12 and, for a given level of average illumination the light falling on the horizontal surface will be considered to represent a basis illumination of 100%.

Figure 2:
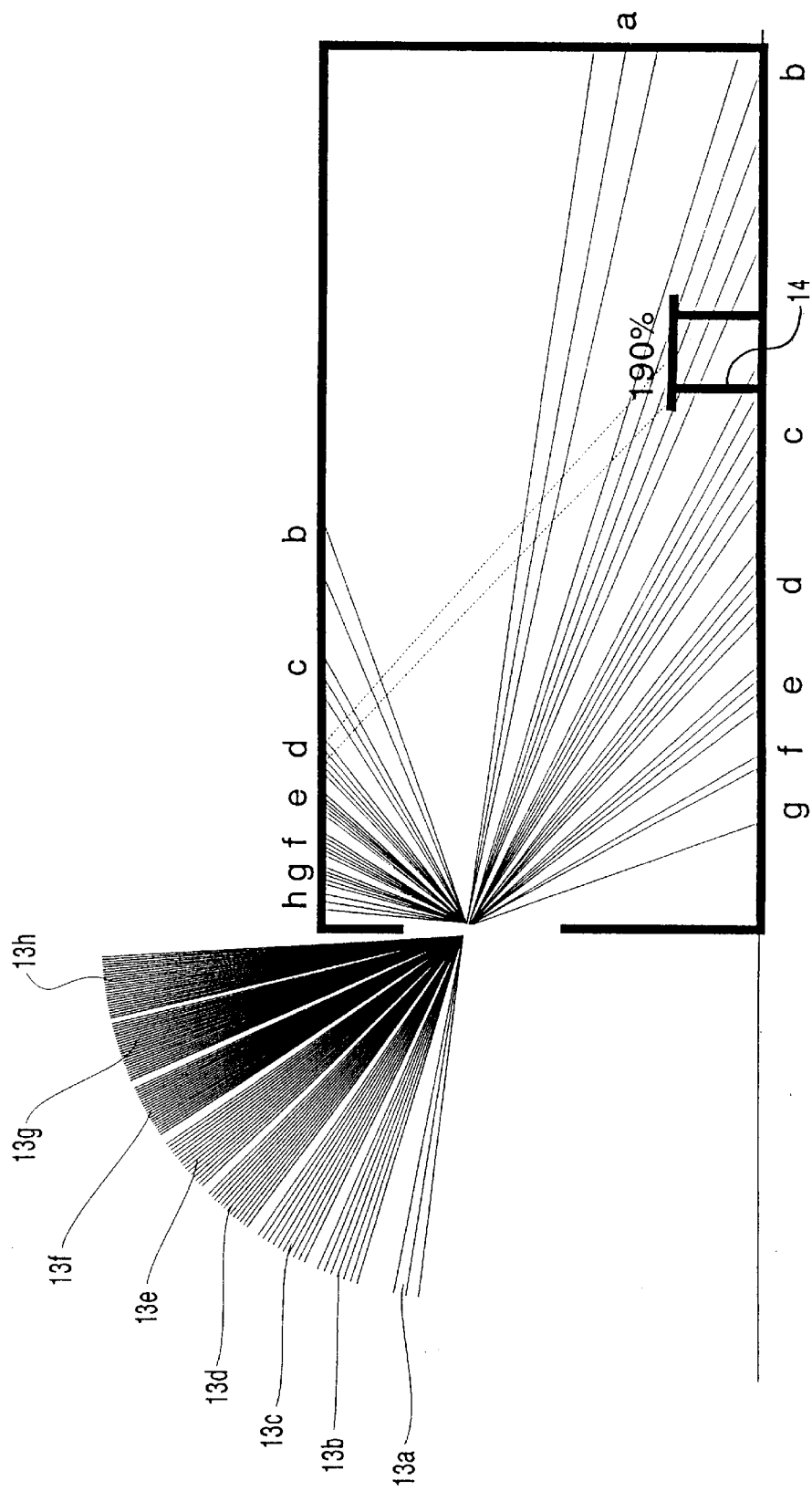
FIG. 2 is a diagram illustrating the distribution of illumination within a room fitted with a glazing component formed as an embodiment of the present invention.

FIG. 2 shows the distribution of light in a building through a window opening equipped with an optical component of the invention. The same reference numerals to identify light beams as used in FIG. 1 have been allocated, but it will now be seen that the total amount of light arriving at the surface of the table 14 is almost twice as much as arrived for the same external illumination through a traditional window as illustrated in FIG. 1. Moreover the distribution of light arriving at the horizontal or floor surface closer to the window is more uniform. If, instead of a plain reflector on the ceiling, a reflector having facetted reflecting surfaces is used, the light may be directed from the ceiling in any chosen direction. In FIG. 2 it will be appreciated that the minor proportion of beam 13a reflected is too small to show on this scale and consequently the incident area a on the back wall is substantially the same as in FIG. 1, whilst the incident beam 13h is substantially entirely reflected so that no corresponding area h on the floor close to the window is seen. The ceiling areas have been identified with the same reference letters to indicate light arriving from the incident bundles identified by the same reference letters on the floor and wall areas.

Figure 3:
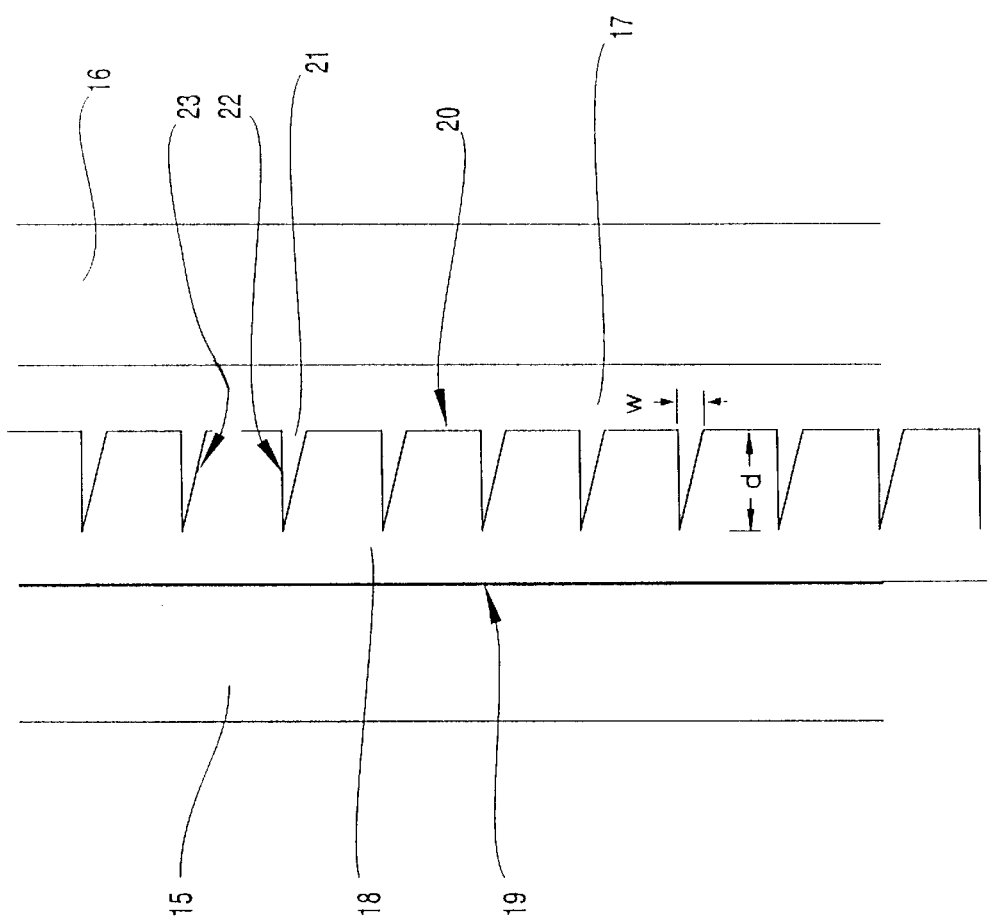
FIG. 3 is a view, on an enlarged scale (but not to scale) of an optical component formed as a first embodiment of the present invention, in position in a glazing panel.

It is assumed in the discussion in relation to FIGS. 1 and 2 that the window 12 comprises a plane sheet of transparent material such as glass, or two such sheets in a conventional double glazing configuration. In FIG. 3 there is shown a part of an optical component forming an embodiment of the present invention located in the cavity between two glass panels or a conventional double glazing cell identified as an outer glass panel 15, an inner glass panel 16 spaced by an air gap 17. The relative thicknesses of the glass and of the air gap are not to scale in relation to the optical component, generally indicated 18 located in the air gap 17.

The optical component 18 comprises a transparent body having a substantially flat planar face 19 and an opposite face 20 in which are formed a plurality of horizontal v-shape grooves 21. Each groove 21 is defined by two flat surfaces, namely a first, or reflecting surface 22 which is orthogonal to the planes defined by the major faces 19, 20 of the component 18 and a second surface 23 which is inclined at a shallow angle to the first surface 22.

As will be described in more detail below, light incident on the outer pane 15 of the double glazing cell is transmitted to the major face 19 of the optical component 18, which will hereinafter be referred to as the incident face, and travels through the body of the optical component 18 until arriving at either the first surface 22 of one of the grooves 21, or the major face 20 of the optical component 18 itself, which will hereinafter be referred to as the exit face of the component. Because the first surface 22 of each groove 21 is perpendicular to the major faces 19, 20 all light incident of the component 18 at angles above the horizontal will travel through the body 18 to reach either the exit face 20 or a first surface 22 of a groove 21. Light above the horizontal is of primary interest as it constitutes the vast majority of the light arriving at a building. Light arriving at an angle below a horizontal elevation is reflected from the ground or surrounding objects, is very much less intense, and for practical purposes of illumination can be neglected as being of insignificant intensity to affect the illumination. It will be appreciated that the dimensions and proportions of this optical component have been shown out of scale for the sake of clarity of explanation.

Figure 4:
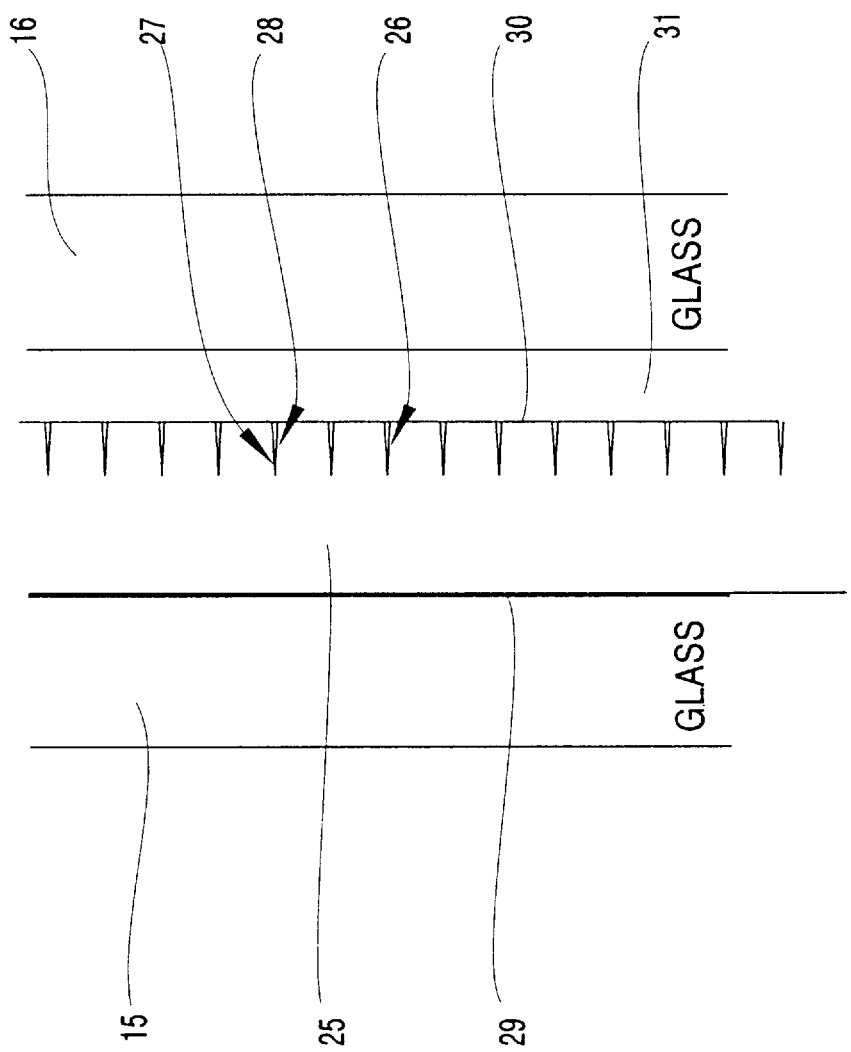
FIG. 4 is a schematic view illustrating an optical component having a different aspect ratio in a composite panel.

FIG. 4 illustrates an embodiment in a more practical form in which aspect ratio w/d is very much smaller. In this embodiment the optical component, now identified with the reference numeral 25 again has a plurality of grooves 26, each groove having a first surface 27 which is perpendicular to the major faces 29 and 30, but as will be seen from FIG. 4 the width w of each groove is reduced to a very low value in comparison with the embodiments of FIGS. 2 and 3, and likewise the depth d of the grooves 26 is a smaller proportion of the overall thickness of the optical component 25 than in the embodiments of FIGS. 2 and 3. As in the embodiment of FIG. 2 the optical component 25 has its incident face 29 in contact with an outer pane 15 of a double glazing cell and its exit face 30 spaced from an inner pane 16 by an air gap 31 which may be the same as or different from the size of the air gap 17 in the embodiments of FIGS. 2 and 3. In practice the width of the grooves may be made significantly less than the pupil of the eye so that the grooves are virtually invisible.

It will be appreciated that the proportion of light reflected at any given angle can be varied by changing the aspect ratio of the grooves. In addition, it is possible to vary the inclination of the two surfaces 22, 23 defining each groove. Again, this allows the designer to vary the ratio between transmitted and reflected light at any angle so that reflected light entering the room in an upward inclination may then be reflected from a highly reflective sealing to arrive at a horizontal surface such as a table or working surface, set deeper into the room than it would otherwise reach through a plain conventional window. In this way light arriving at the window can be distributed having been split into two components, in such a way that an interior volume within a building can be more uniformly illuminated by windows in a facade.

Figure 5:
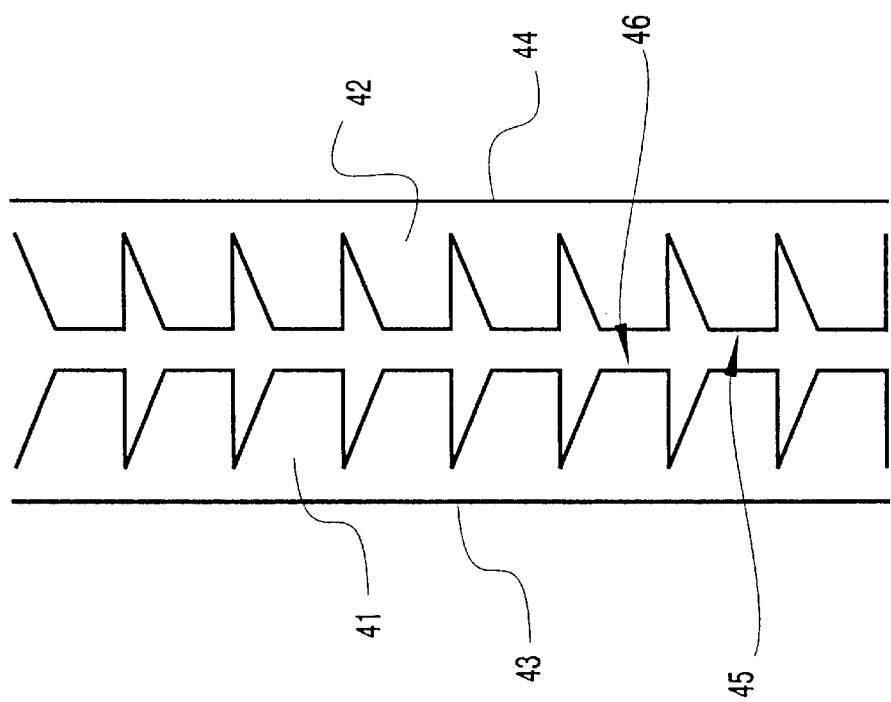
FIG. 5 is a schematic view, similar to that of FIG. 6, illustrating a further embodiment having two optical elements.
Figure 7:
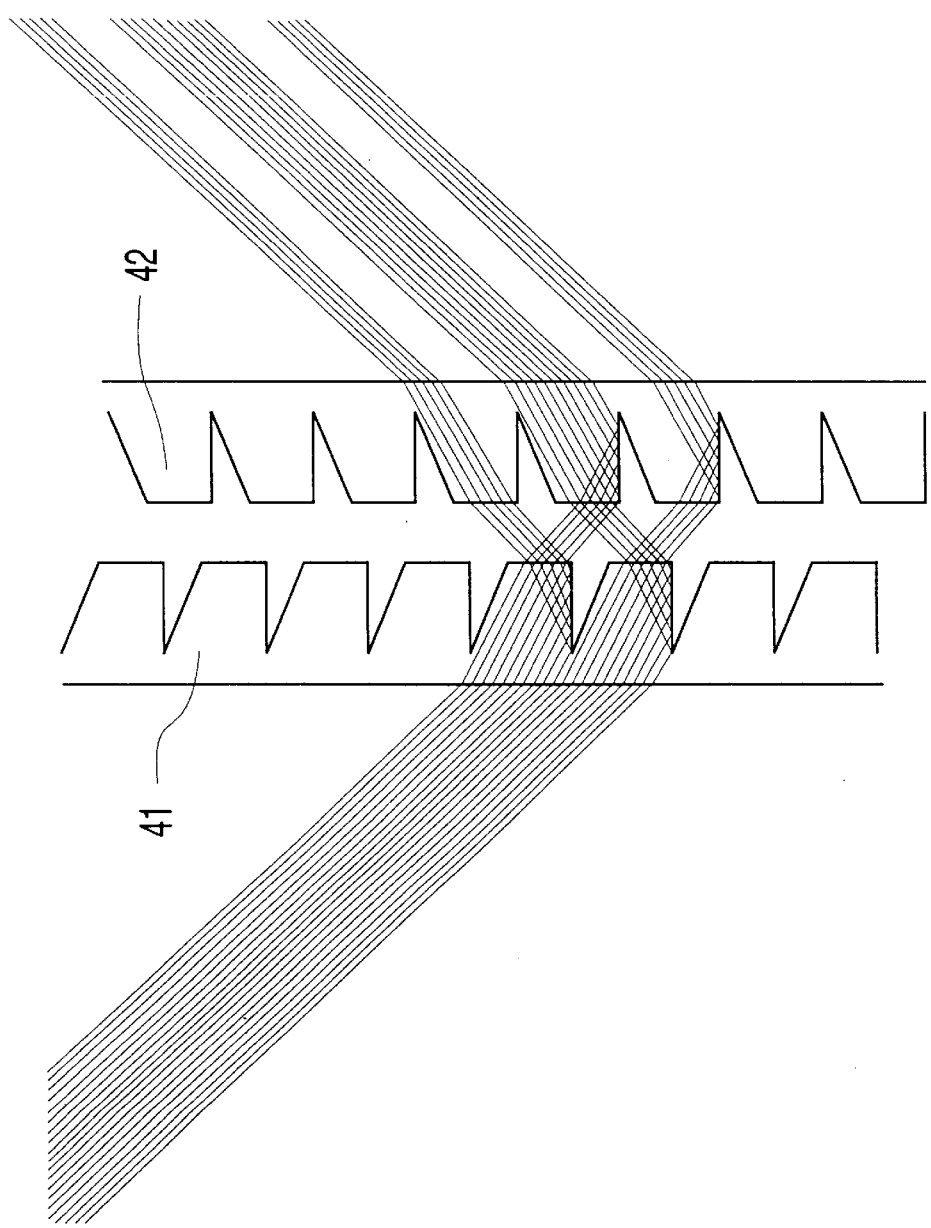
FIG. 7 is a schematic view of a further alternative embodiment in which the two elements have surface features which are offset from one another.
Figure 8:
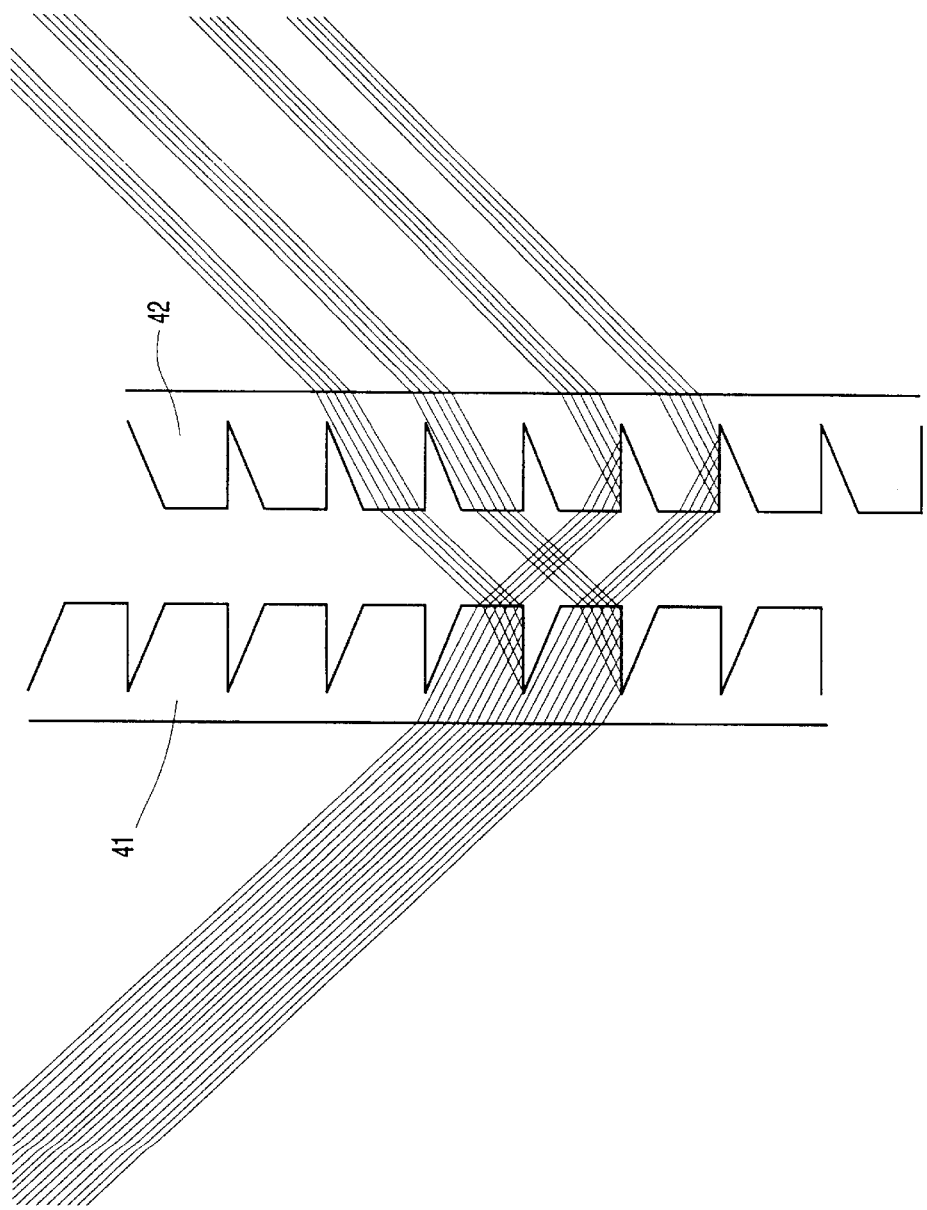
FIG. 8 is a schematic diagram illustrating an embodiment of the invention in which the surface features have a different form from that illustrated in the preceding embodiments.

FIG. 5 illustrates a further embodiment of the invention, in which there are two optical components 41, 42 facing one another. The optical components 41, 42 are made to the same form as the component 18 in FIG. 2, with the exception that component 42 is reversed such that incident light arrives first at the major face having the plurality of grooves. Depending on the nature of the material from which the components 41, 42 are made the planar outer surfaces 43, 44 may constitute the external surfaces of the glazing panel, or each component may be supported against a glass pane as in the earlier embodiments. As can be seen in FIG. 7 the two optical components 41, 42 are positioned such that their grooved faces 44, 45 are spaced from one another although, as can be seen in FIG. 8, the two components may, in an alternative embodiment, be in contact with one another.

Figure 6:
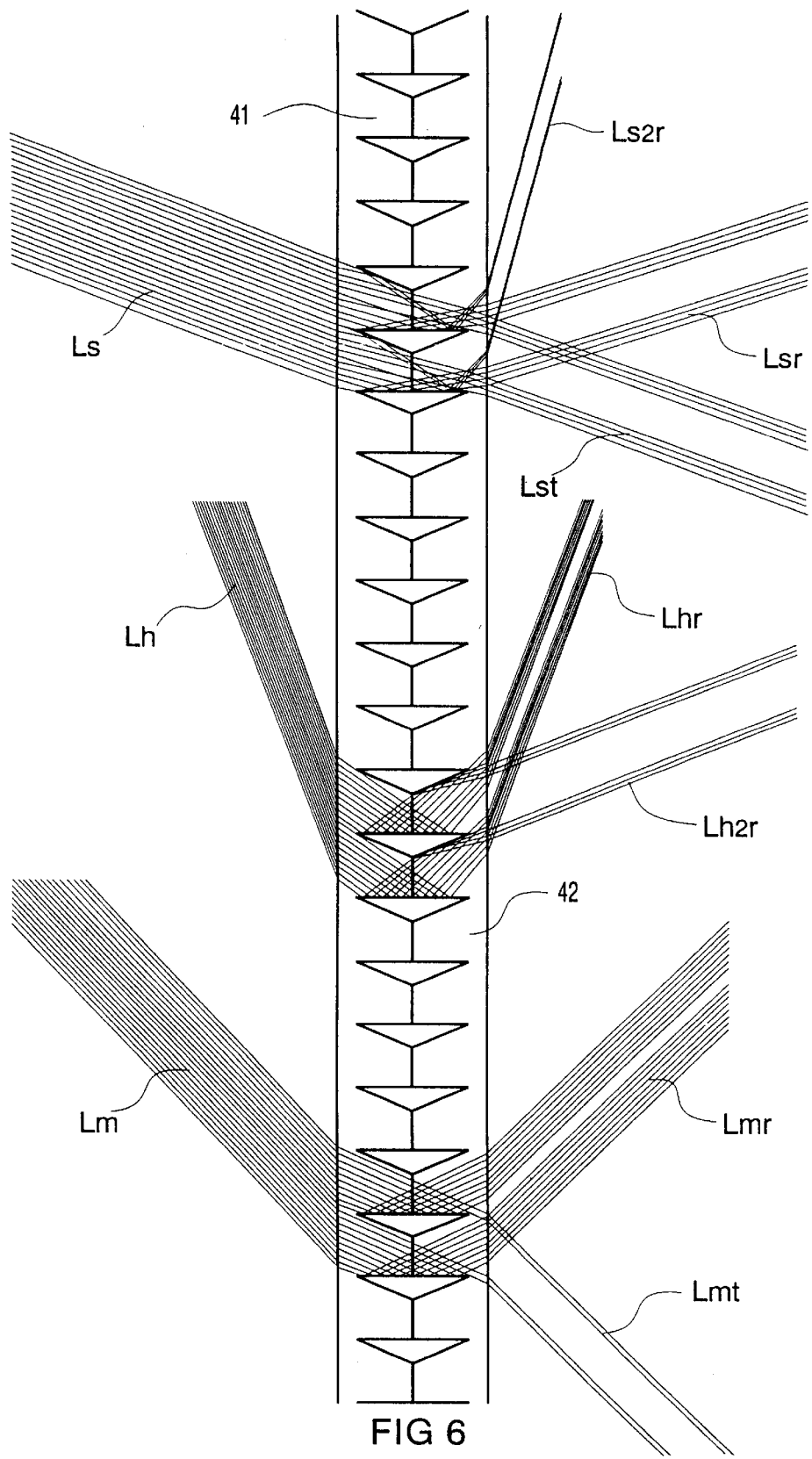
FIG. 6 is a schematic view illustrating an embodiment such as that shown in FIG. 5, in which the two elements are in contact with one another.

FIG. 6 illustrates three different sets of rays passing through the optical component. Here, incident light at the shallow angle, indicated Ls, is diverted by reflection and refraction into three beams, a first, transmitted beam Lst, a second, reflected beam Lsr, which is reflected from the horizontal "first" surfaces of the grooves, and a second reflected beam which is reflected from the lower "second" surfaces of the grooves in the outer component 41, and then subject to a second reflection, this time at a higher angle of incidence, at the "first" surface of the inner optical component 42 to produce a highly diverted beam Ls2r. At intermediate angles of incidence shown by the incident beam Lm the majority of light is reflected into the reflected beam Lmr with only a minor proportion passing through the component to form the transmitted beam Lmt. At higher angles of incidence, such as that illustrated by the beam Lh (which may be, for example, in the region of 70° elevation from the horizontal) all of the incident light is reflected at the "first" surfaces of the grooves with none being transmitted although, due to interception at the lower or "second" surface of the inner optical component 42 a proportion of the reflected light is reflected a second time to form a second reflected beam Lh2r.

In an embodiment such as that illustrated in FIG. 6 the closed voids defined by the facing grooves on the inner faces of the optical components 41, 42 can selectively be filled with a liquid having the same or substantially the same refractive index as the material in the optical components 41, 42, in which case all of the incident light will be transmitted substantially undeviated so that the day light may be directed towards the ceiling or towards the floor selectively. This allows a "sunblind" effect to be achieved in circumstances where the optical component is designed to divert a major portion of the incident light towards the ceiling thereby avoiding glair from direct sunlight. In low incident light conditions the fluid can be introduced into the voids to allow the light to enter directly.

Figures 9, 9A:
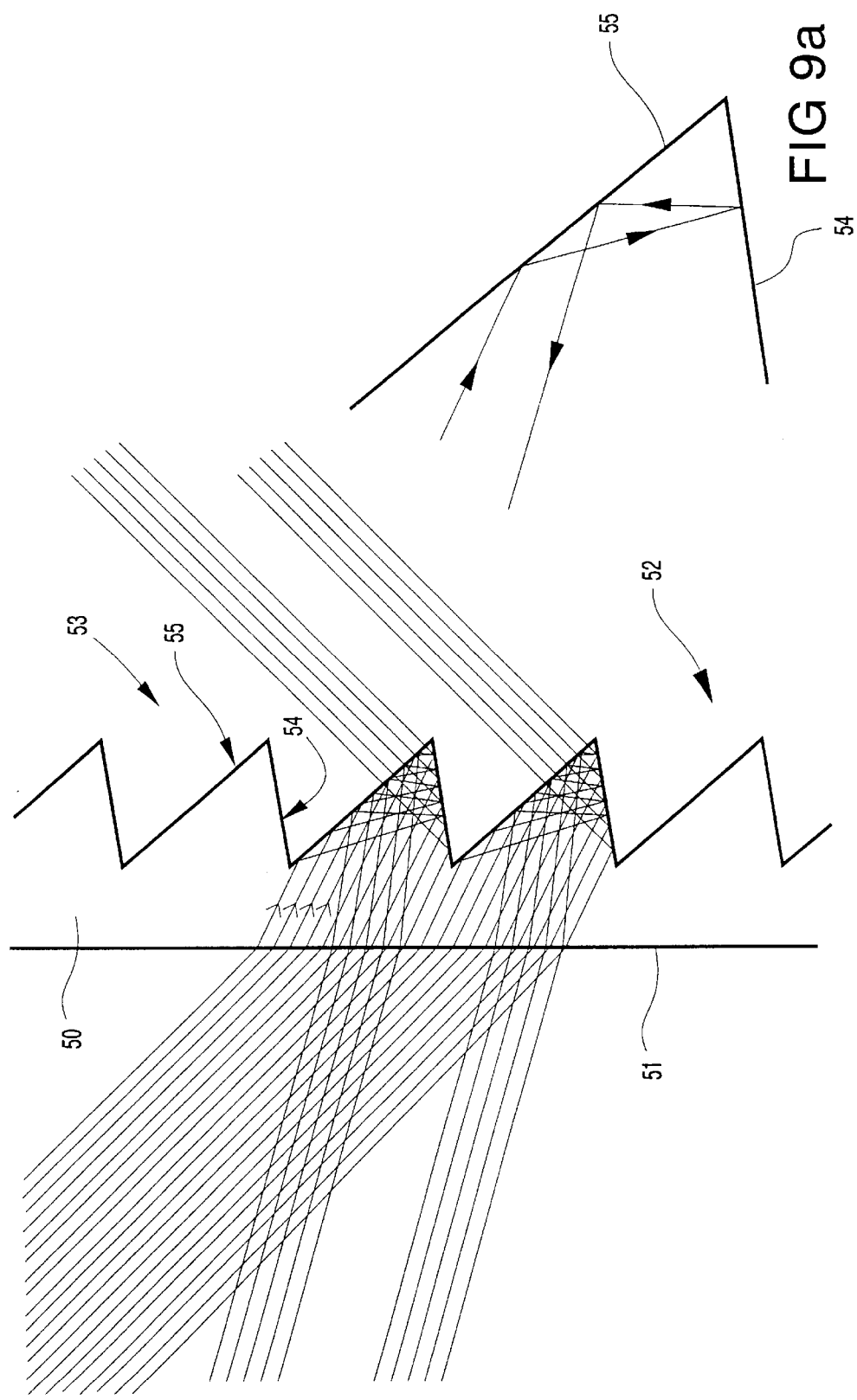
FIGS. 9 and 9a are ray diagrams illustrating the path of light rays through an embodiment designed to give a sun-blind effect.

Turning now to FIG. 7, an alternative embodiment utilising two optical components 41, 42 is shown in which the grooves in the components are offset from one another by half the pitch between adjacent grooves. As illustrated in FIG. 9, at an elevation of 45° all of the incident light is reflected. Notwithstanding this, at lower angles of incidence a major proportion of the light is transmitted to allow direct viewing through the component.

FIG. 8 illustrates another "sun blind" configuration in which two optical components 41, 42 are again used. The grooves in the two components 41, 42 are positioned facing one another and in register, but the spacing between the components 41 and 42 is chosen such that, at a certain angle of elevation, say 45°, (and above) all of the incident light is reflected towards the ceiling and none is transmitted. Below this angle of incidence a small proportion of the light is transmitted and at horizontal (that is 0° elevation) incidence substantially all of the light is transmitted.

FIG. 9 illustrates an alternative embodiment of the invention in which the spacing between the grooves is zero. In FIG. 11 only an optical component 50 is illustrated although, as before, it may be supported on either its incident face 51 or its exit face generally indicated 52 by a pane of glass, or by a pane of glass on each face. The grooves formed in the exit face 52 are identified with the reference numeral 53 and each comprise, as before, two planar faces 54 and 55 with the aspect ratio of depth to width d:w chosen as 0.73. The two surfaces 54, 55 effectively define reflector and refractor facets and, as can be seen by the ray trace in FIG. 11a, at an incident elevation of 45° a proportion of the light is reflected upwardly towards the ceiling whilst a corresponding proportion is reflected upwardly and away from the building. It will be seen from the inset drawing FIG. 11a illustrating one ray path that the light reflected away from the building is in fact reflected three times, twice by total internal reflection at the facet 55 and once by reflection at the facet 54 which may be silvered for this purpose in order to achieve reflection at a high angle of incidence. Such an embodiment is useful where it is desired to restrict the amount of solar energy entering a building. In such an embodiment, of course, direct observation through the window is not available except for a narrow range of angles of incidence below 0°.

If both a sun blind effect and vision through the window at horizontal or near horizontal angles are required this can be achieved with an embodiment such as that illustrated in FIG. 10. In this embodiment a grooved optical component 50 such as that illustrated in FIG. 9 is backed by a correspondingly shaped grooved optical component 60 with its grooves intercalated with the crests separating grooves in the component 50. This has been shown on an enlarged scale in order to illustrate the inter-relationship between the two components. The relative positioning of these two components allows light at shallow angles to pass through without substantial aberration.

FIG. 11 illustrates an embodiment such as that of FIG. 10 showing the ray trace for light at 45° elevation which is partly reflected into the building with a major proportion being reflected away from the building. Although represented as a single line the interface between the two components necessarily involves a small gap to achieve the total internal reflection. In this respect the gap shown in FIG. 10 the scale of which is enlarged laterally to emphasise the provision of the gap may be extremely small providing it is sufficiently large to allow the phenomenon of total internal reflection to occur.

Figure 12:
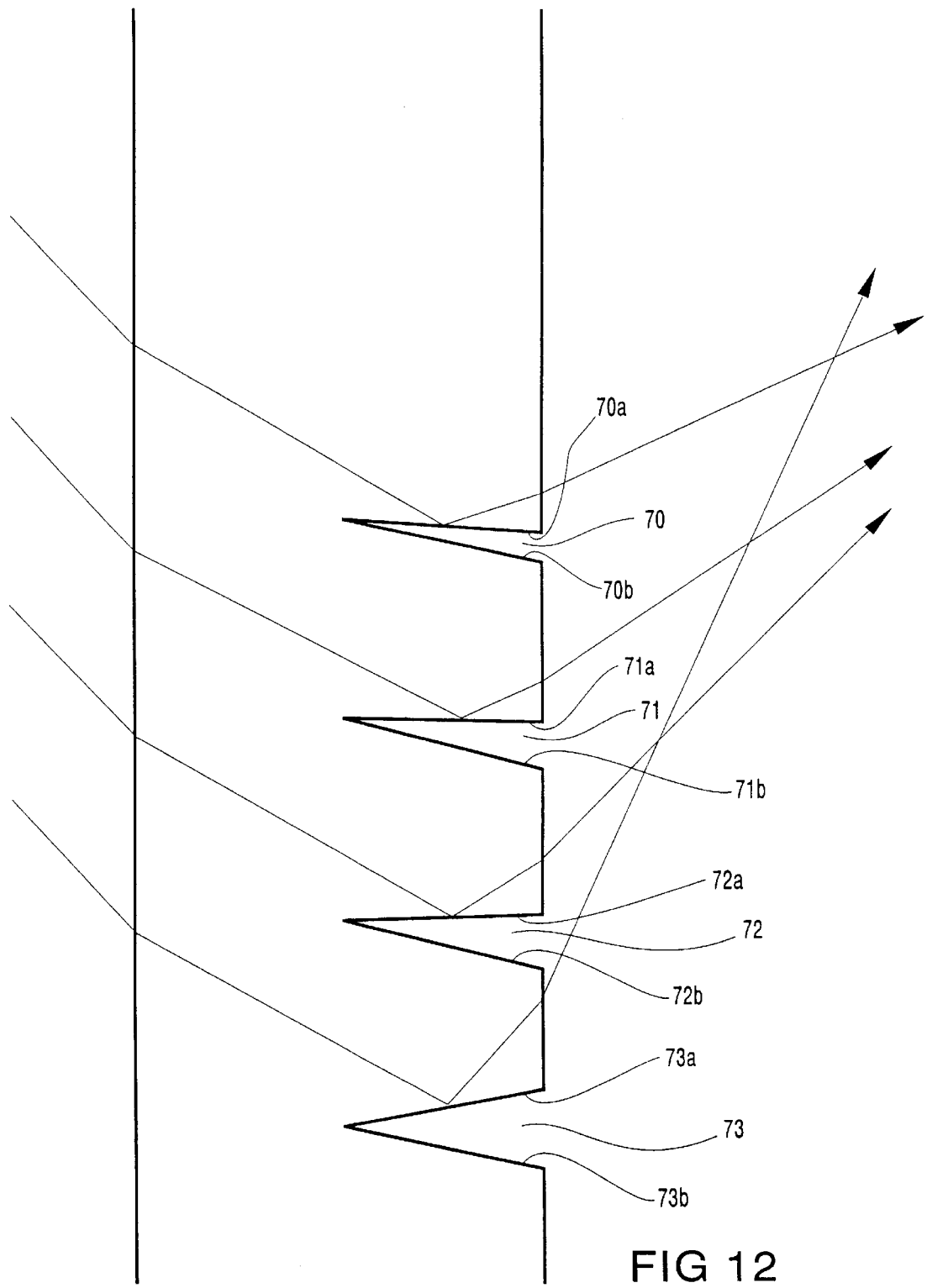
FIG. 12, 13 and 14 are enlarged diagrammatic views of elements suitable for use in further embodiments of the invention.
Figure 13:
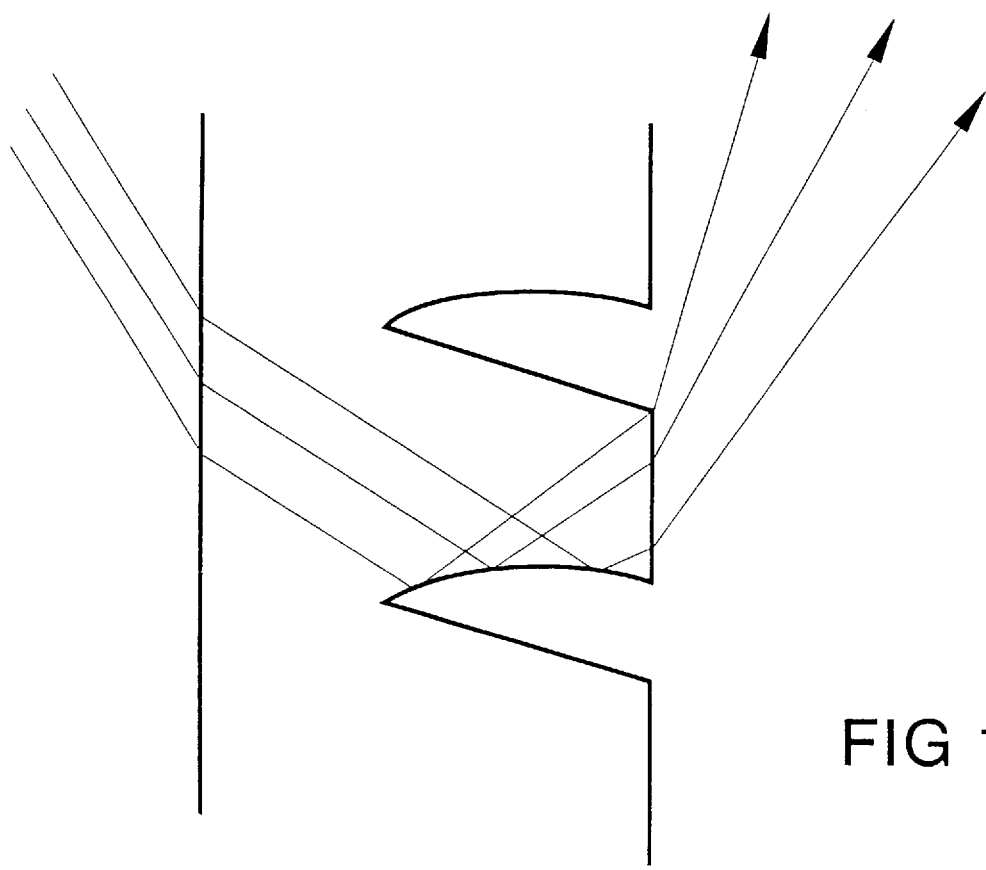
Figure 14:
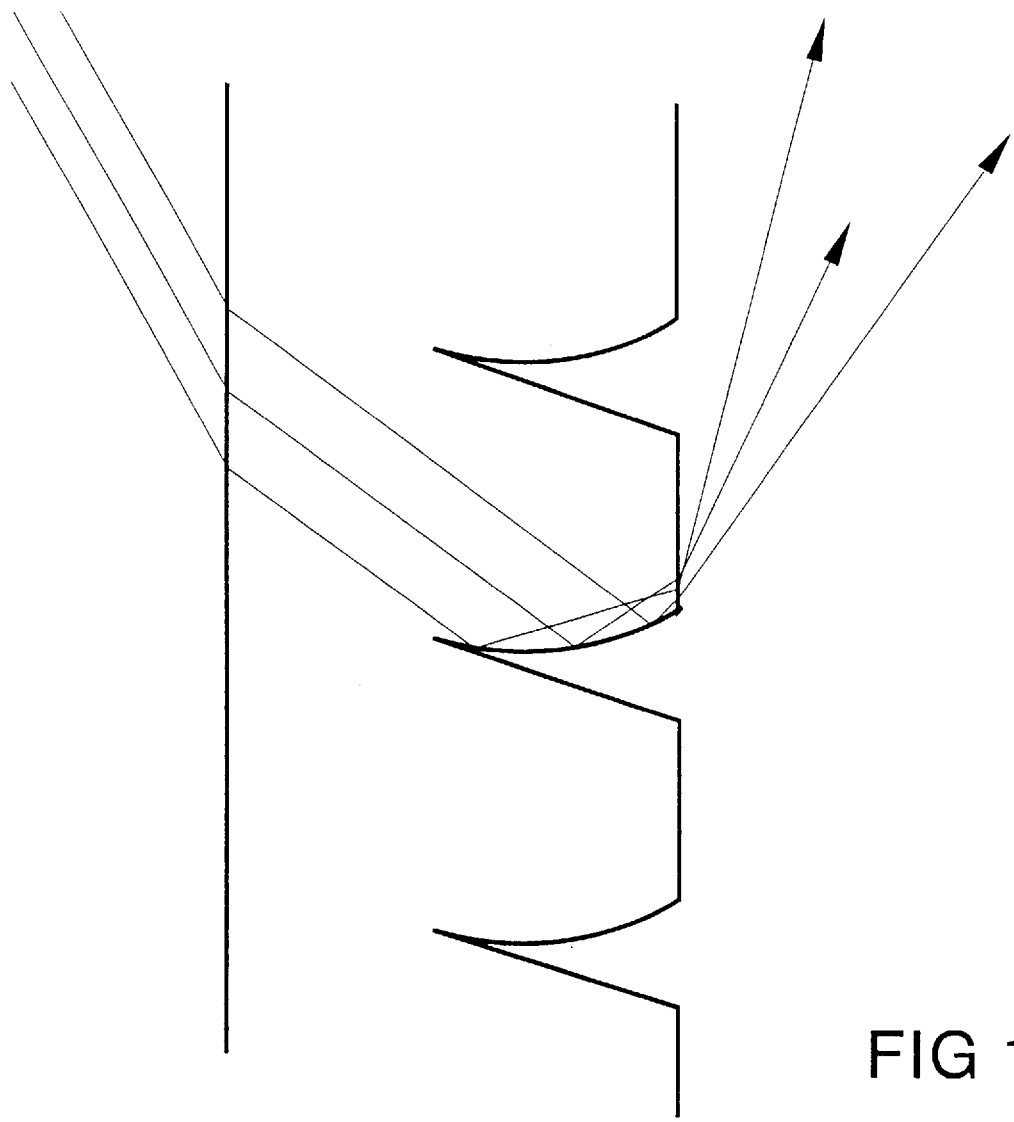

The embodiments of FIGS. 12, 13 and 14 address the problem of reflection of the solar disc upwardly by the reflector facets of the optical component of the invention. Although it is true to say that the light incident on a glazing panel arrives from a wide range of directions, there is the possibility that on cloudless days, when the sun is in a certain range of positions, a concentration of light arrives directly from the solar disc. This has two disadvantageous effects: the first of these is the above-mentioned risk of glare or dazzling by upwardly reflected light being viewed by an observer looking downwardly at the lower part of a glazing panel, for example from a standing position close to the glazing panel within a room. Although this would not necessarily be worse than the glare arriving directly from the sun through a conventional glazing panel, its unexpected orientation may cause difficulties, especially since in this situation the observer may wish to view through the glazing panel to see the surrounding environment. The embodiment of FIG. 12 addresses this problem by providing grooves 17 which, instead of having constant inclination, have an inclination of at least one face (namely the reflector face) which varies from top to bottom of the panel. In FIG. 12 the embodiment has been illustrated on an enlarged scale to show four grooves the relative inclinations of which have been exaggerated for the sake of clarity. These grooves are identified 70, 71, 72 and 73, each being defined by an upper or reflector facet 70a, 71a, 72a and 73a and a lower facet 70b, 71b, 72b, 73b. In this embodiment the lower facets 70b–73b are of constant inclination with respect to the major faces of the panel although, of course, the inclination of the lower facet may vary as well as that of the upper facet.

As can be seen in FIG. 12, light incident at a given angle, for example arriving from the solar disc, is reflected by the facets 70a–73a through a greater angle near the bottom of the panel than it is near the top of the panel with the intention that at the lower part of the panel, where an observer may look down towards the ground, light from the range of angles likely to be covered by the solar disc during that part of the day when it is sufficiently bright to cause uncomfortable glare, is strongly reflected so that the reflected rays lie close to the panel. In an alternative embodiment the range of variation of inclinations may be reversed so that the light incident at a higher point in the panel is reflected more strongly than light incident at a lower point. The intention here is to cause divergence of the reflected light so that there is no concentration at a given angle which could cause discomfort or dazzling. As can be seen in FIG. 12, the intersection of different beams occurs at a distance from the glazing panel equivalent to no more than twice the thickness of the panel (which may typically be in the range of only a few millimetres) so that an observer cannot position his eye at any point where reflected rays intersect.

Figure 16:
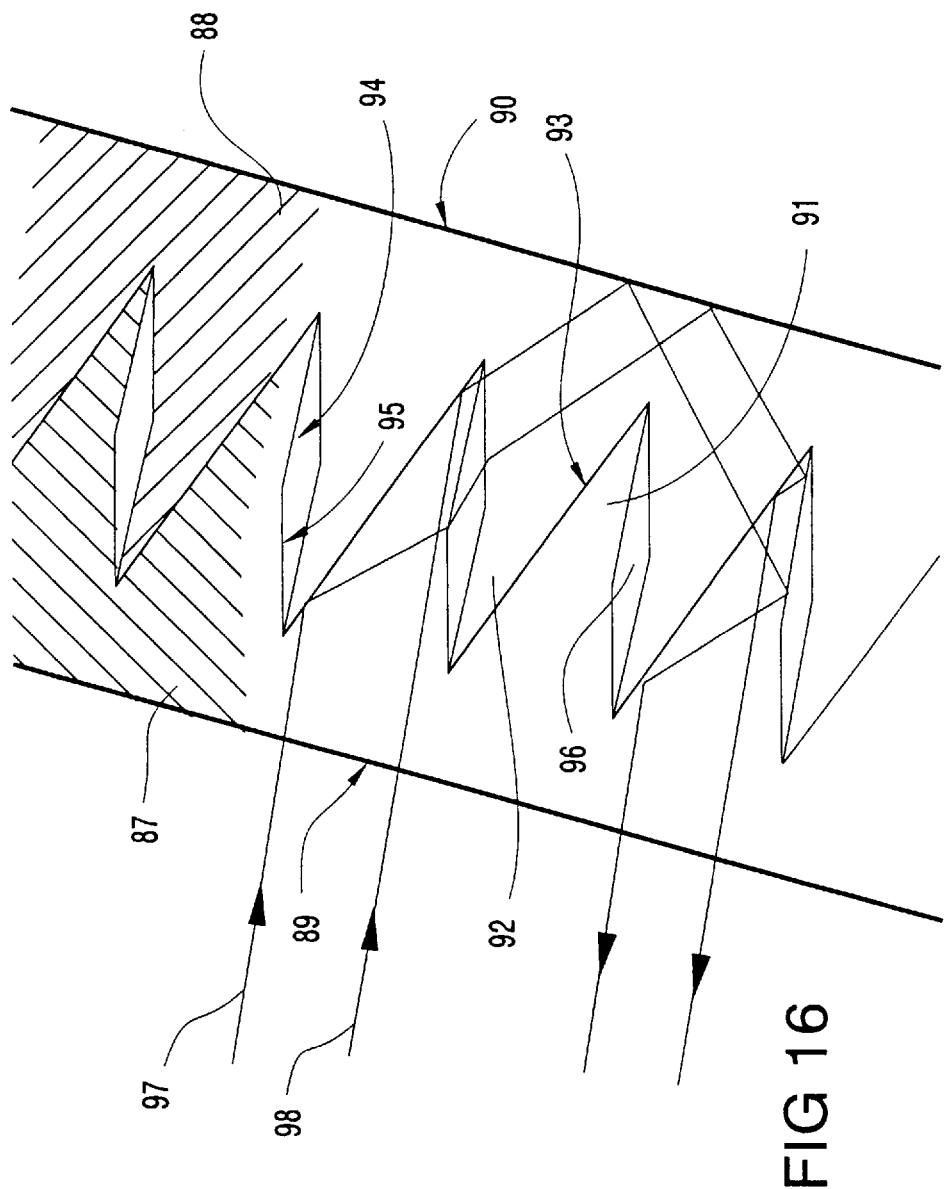
FIG. 16 is a similar sectional view through a second embodiment of the invention.

In the embodiment of FIG. 13 the upper or reflective facet of the groove is convex towards the direction of incident light, causing divergence in the reflected beam as illustrated, and likewise, in FIG. 16 the upper facet is concave towards the direction of incident light (which although it involves intersection of reflected beams, nevertheless produces divergence of the reflected light at any practical viewing distance.

As far as manufacturing techniques are concerned, it may be difficult to produce the embodiment of FIG. 13, in which the reflector facet is convex, but this may be overcome using suitable techniques.

The other problem which is overcome by the embodiments of FIGS. 12, 13 and 14 is that of the possibility of focused hot spots on the ceiling from the solar disc. By creating a wide divergence in the light arriving from a given direction, upon reflection the light from the solar disc is spread over a wide area of the ceiling. This also minimises any brightness variations caused by intensity differences in light arriving from different directions.

Figure 15:
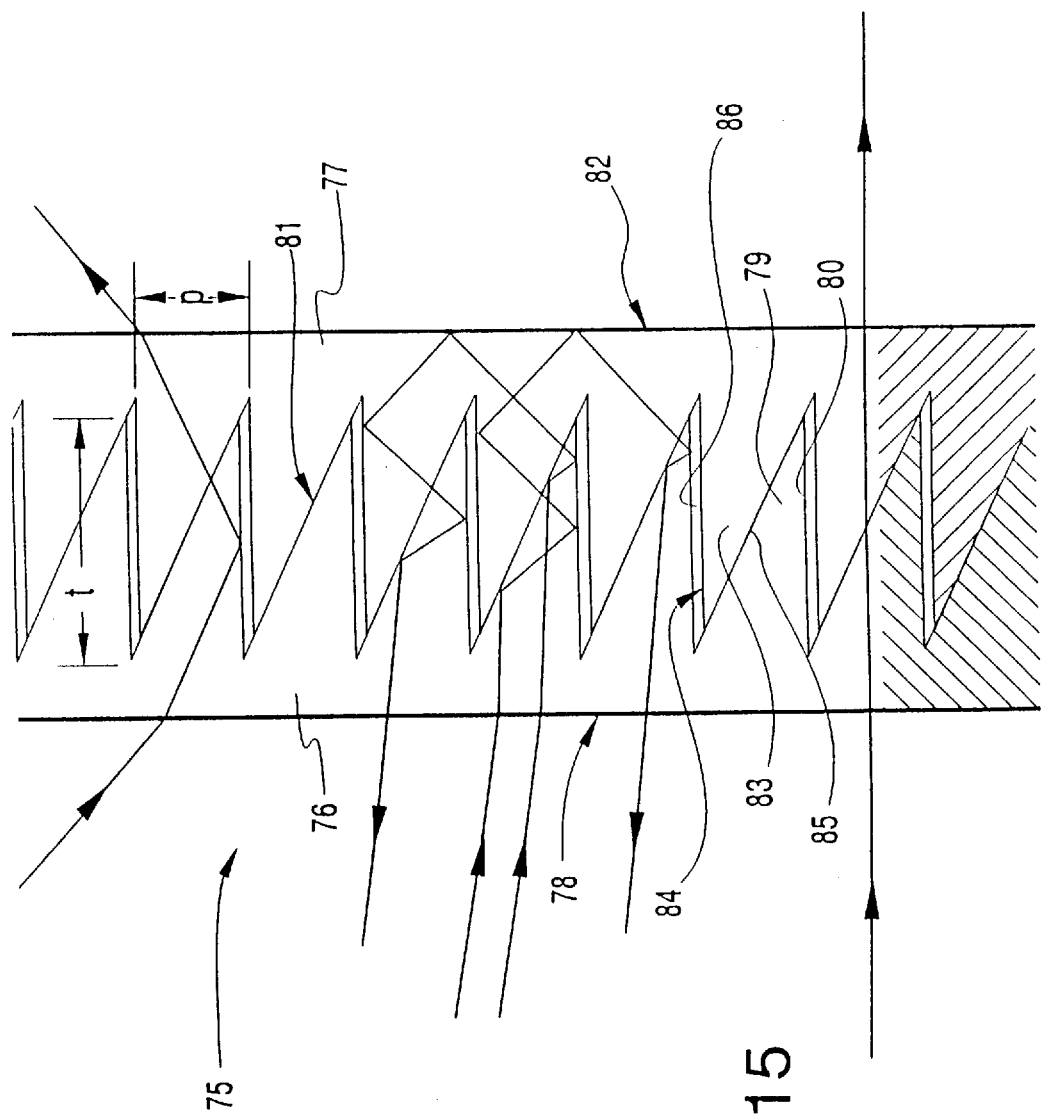
FIG. 15 is a schematic sectional side view of a first embodiment of the present invention.

The embodiment of FIG. 15 comprises a composite panel generally indicated 75 comprising two elements 70, 77 which, in this embodiment, are exactly identical to one another. This simplifies manufacture. The element 76 comprises a monolithic transparent body having a flat major face 78 and a regular array of substantially identical grooves separated by correspondingly shaped ribs 79. Each rib 79 is defined by a first face 80 substantially orthogonal to the major face 78, and a second face 81 inclined at approximately 30° to the orthogonal face 80. The body 77 has a flat major face 82 oppositely from which projects an array of regular triangular ribs 83 defined by a first, orthogonal face 84 and a second, inclined face 85 the angle of inclination of which is identical to that of the inclined face 81 of the triangular rib 79 of the first element 76.

The two elements 76, 77 are reversed and inverted with respect to one another such that the ribs 79 of the element 76 penetrate the grooves defined between the ribs 83 of the element 77. The inclined faces 81 and 85 are in contact with one another whilst the orthogonal faces 80, 84 are separated by a small air gap 86.

The dimensions may be such that the overall thickness of the component 75 is in the region of 1.6 mm whilst the ribs are approximately 0.5 mm wide at their root (and correspondingly the tips of the ribs are 0.5 mm apart) and in the region of 1 mm in height.

In order to define the physical configuration of the surfaces defining the ribs it is possible to identify two ratios, namely the "aspect" ratio namely the ratio between the height t and the peak-to-peak separation p of the ribs (aspect ratio: t/p) and an asymmetry ratio defined by the apex location of each rib in relation to its root width given by h/p where h is the distance from one side of the root of a rib to the peak and p is the root width or peak-to-peak separation. In the embodiment of FIG. 1 the dimension h is 0 therefore making the apex location ratio h/p=0 whilst the aspect ratio t/p is approximately 2.

The path of several incident rays has been traced assuming that the refractive index of the material from which the elements is made is 1.492 whilst the refractive index of the medium between the inclined faces 81, 85 (which may be an adhesive) is 1.38 and the medium between the orthogonal faces 80, 84 is air of refractive index 1.00. This embodiment has a particularly valuable feature in that incident light approximately 5° above the horizontal is reflected by multiple internal reflections; light incident horizontally is transmitted substantially undeviated; and light above a certain critical angle is transmitted through the component after a single reflection at the interface between the ribs 79 and the air gap 86 defined by the orthogonal faces 80. The retro-reflection of the rays illustrated provides a sunshading effect which prevents the transmission into the building of direct rays from the solar disk at a selected range of elevations to avoid glare. Suitable choice of the aspect ratio t/p, peak offset position h/p and the refractive index of the material, as well as the thickness of the material can vary the inclination at which this sun shading effect occurs. In this respect the thickness of that part of the element between the bottoms of the grooves and the flat major face is of significance in determining this aspect of the behaviour of the optical component of the invention.

Although embodiments of the present invention may be used, as shown in FIG. 15, in a purely vertical orientation, they may be adapted for adjustable inclination about a horizontal axis, perhaps being formed as supplementary external components on the exterior of a conventionally glazed window. Or alternatively a window provided with the optical component of the invention as a part thereof may be mounted so as to be tiltable whereby to adjust the angle at which the sun shading effect takes place. Inclination of the optical component of the present invention also greatly increases the amount of light collected for transmission by including the light very close to the vertical which can be transmitted into the interior of the building after one or more reflections at internal interfaces. Such close-to-vertical incident light is lost to conventional vertical glazing panels. Increases in the overall internal illumination within a building may thus be achieved.

In the embodiment of FIG. 16 there are two similar optical elements 87, 88 having respective major planar faces 89, 90 and an array of oppositely directed ribs 91, 92 respectively. In this case, however, the ribs 91 are defined by a flat planar face 93 on one side whilst being defined by two, slightly inclined planar faces 94, 95 on the other. The effect of this, in relation to the embodiment of FIG. 1, is to define an airspace 96 between adjacent ribs 91, 92 which is trapezoidal in shape. This serves to direct the bundles of light rays into a narrower transverse dimension after transmission across the air gap 96, as shown by the two examplary boundary rays 97, 98. This allows less scope for the edges of a bundle of rays to behave differently upon reflection at the inner major face 90 of the element 88. The embodiment of FIG. 3 is illustrated at an inclination to demonstrate the awning effect referred to in relation to the embodiment of FIG. 15.

Figure 17:
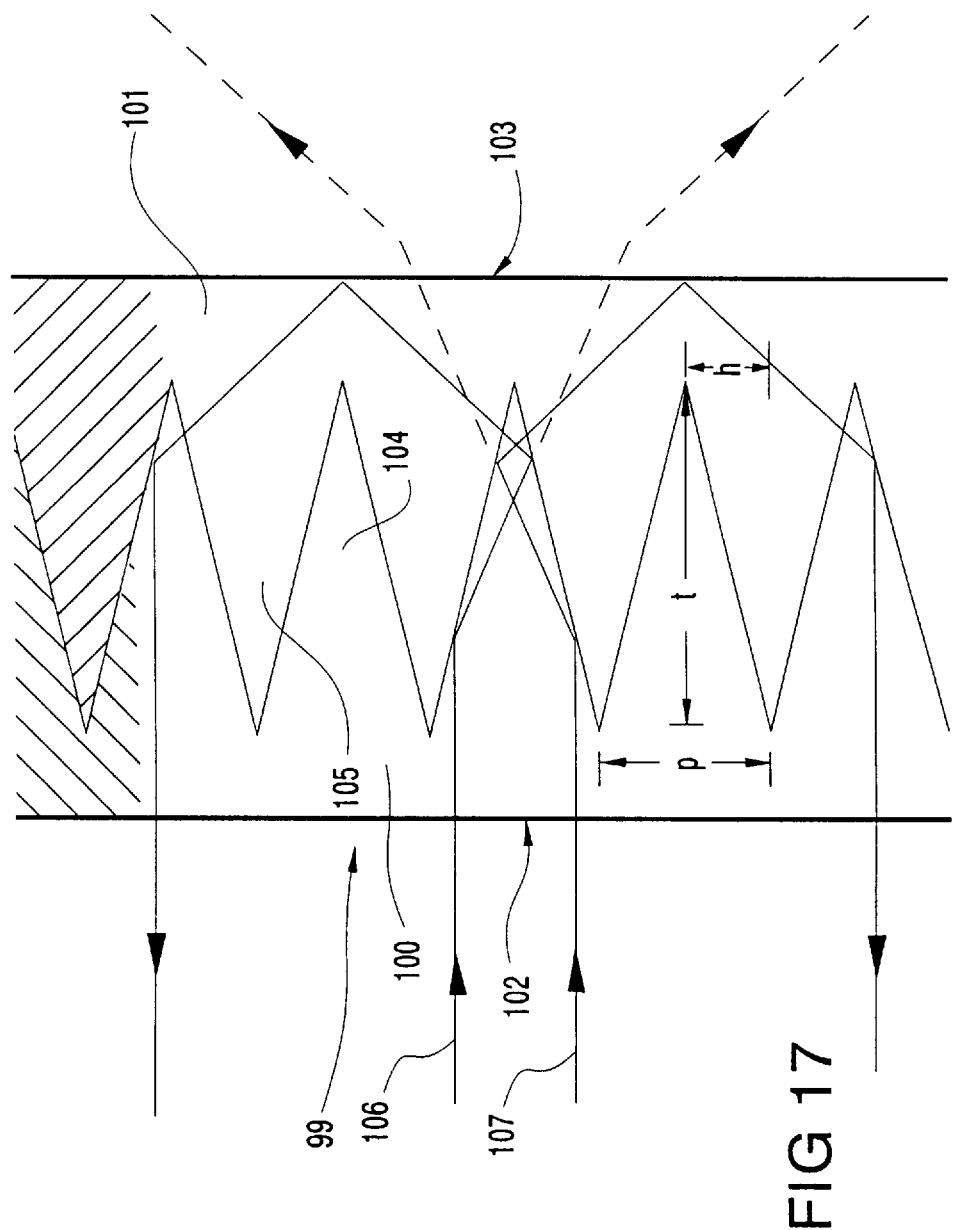
FIG. 17 is a sectional view through a further embodiment of the present invention having symmetrical elementary surfaces.

The embodiment of FIG. 17 is, again, an optical component 99 comprising two identical elements 100, 101 having flat planar faces 102, 103 and oppositely directed symmetrical ribs 104, 105. Not only are the ribs 104, 105 symmetrical and identical in shape, but also the grooves defined between adjacent ribs 104, 105 are of exactly the same shape so that when the two elements 100, 101 are fitted together as shown in FIG. 17 the two sets of grooves are entirely filled by the correspondingly shaped sets of ribs 104, 105. Again the contacting faces of the ribs 104, 105 may be bonded by an adhesive having a selected refractive index thereby influencing the optical behaviour of the component. In solid outline are shown the ray traces of two rays 106, 107 incident perpendicular to the external face 102 of the outer element 100. If the refractive index of the medium between the two elements is air (of assumed refractive index 1.00) the rays follow the paths indicated in solid outline to be reflected back on themselves whereas if the refractive index between the two elements 100, 101 is determined by an adhesive at, say, 1.40 then the incident rays 106, 107 would be transmitted along the broken outline paths shown rather than being reflected. These design options allow the designer to determine the optical properties of the component in dependence on the required function.

Figure 18:
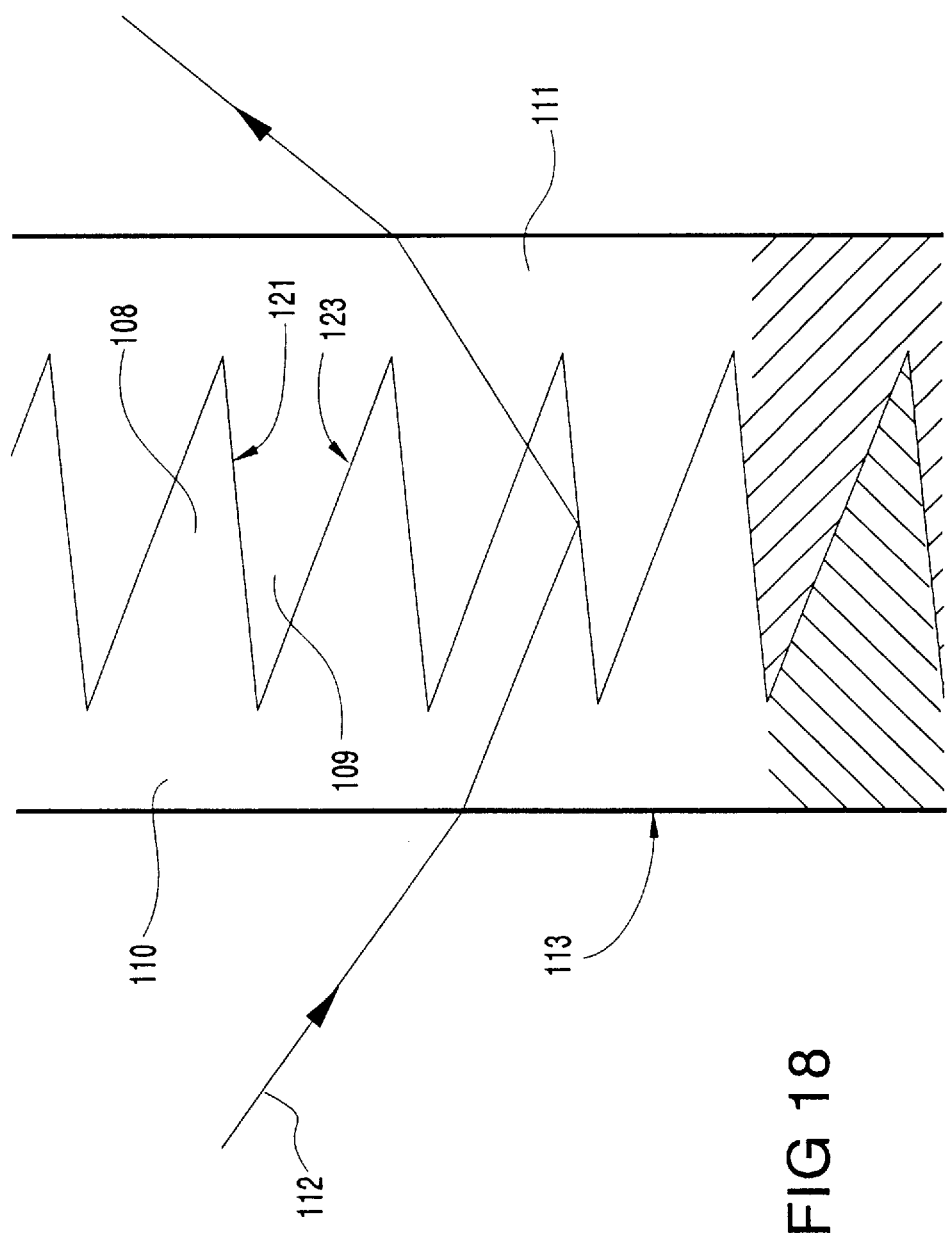
FIG. 18 is a sectional side view, of a further embodiment of the invention having asymmetrical elementary surfaces.
Figure 19:
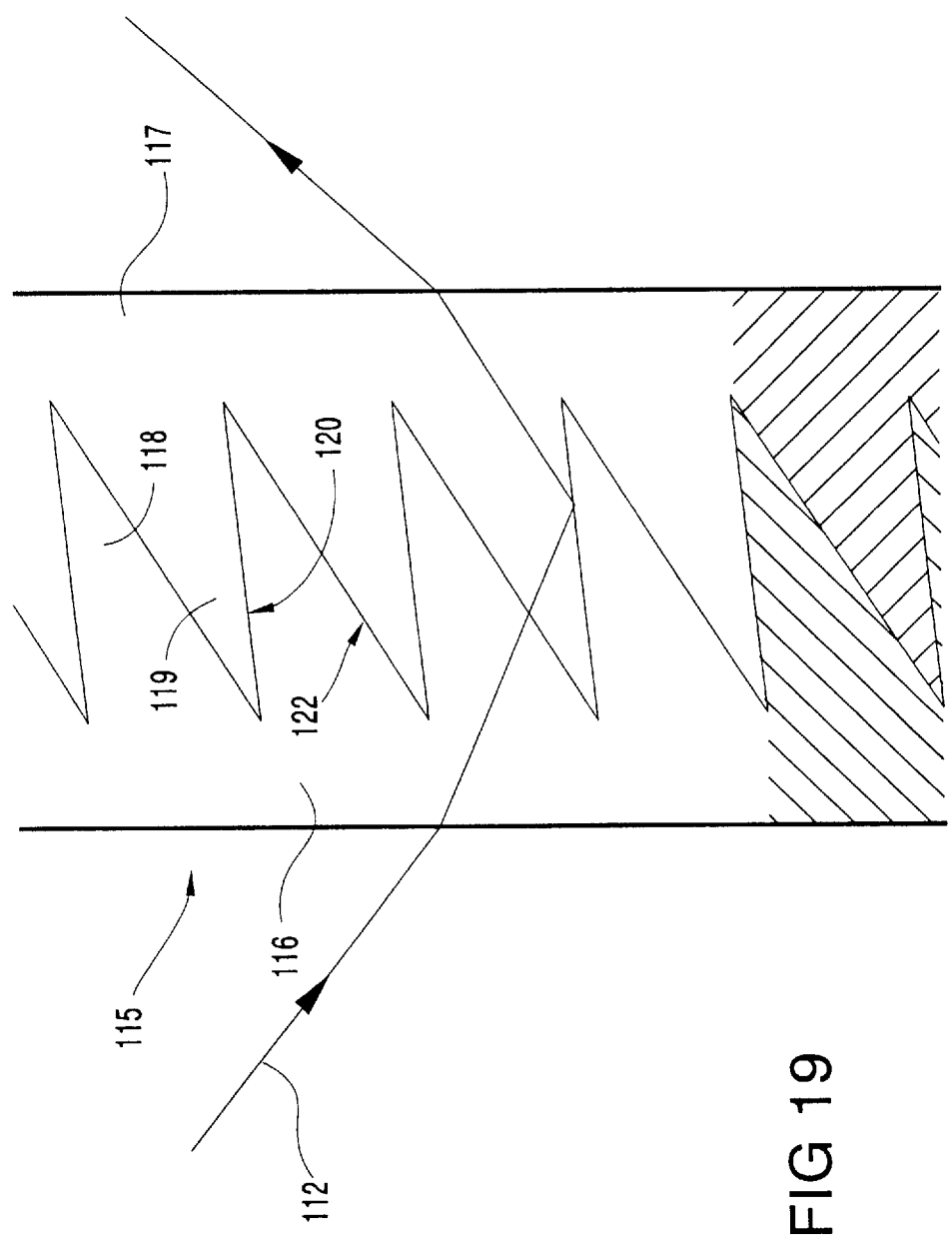
FIG. 19 is a sectional side view similar to that of FIG. 18, in which the asymmetric elementary surfaces are oppositely inclined.

Turning now to FIG. 18 an embodiment similar to that of FIG. 17 (in that the oppositely directed ribs are identical) is shown, but in this case the ribs (in this embodiment identified by the reference numerals 108, 109) are slightly asymmetric with respective surface angles at 94.9° and 67.5°. The aspect ratio t/p is 2. If the refractive index of the medium between the elements 110, 111 is 1.00 then an incident ray illustrated as 112 will be reflected at the interface between two adjacent ribs 108, 109 to be transmitted at an increased elevation within the interior of the building. The incident ray 112 illustrated is chosen to be that which, upon refraction at the incident face 113 of the element 110 is transmitted through the element 110 parallel to the more inclined interface between adjacent ribs 108, 109 and, by comparison with FIG. 19 the reversibility of the transmission path can be seen. In FIG. 19 there is shown a component 115 comprising two elements 116, 117 having respective ribs 118, 119 a first face 120 of which inclined at the same angle as the corresponding interface 121 in the embodiment of FIG. 18, but the more inclined interface 122 is oppositely directed from that of the corresponding inclined interface 123 in the embodiment of FIG. 18. Notwithstanding this the path of the ray 112 can be seen to be substantially the same since at its transmission through the interface 122 it is not deviated if the refractive index of the medium between the ribs is 1.00, and therefore only the total internal reflection at the interface 120 occurs, which is exactly the same as in the embodiment of FIG. 18.

Figure 20:
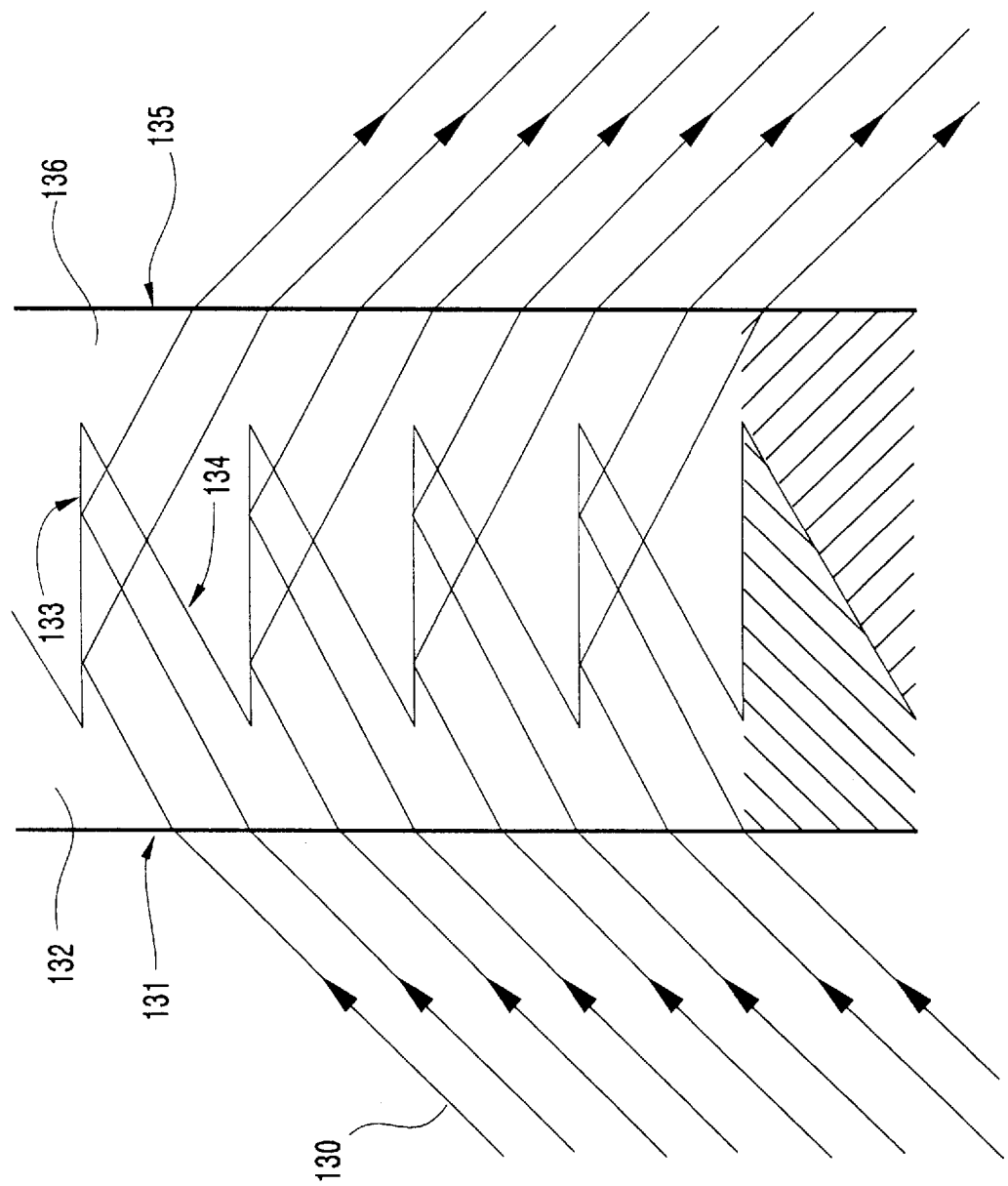
FIG. 20 is a sectional side view, on an enlarged scale, of an embodiment of the invention having particularly valuable characteristics.

FIG. 20 illustrates another embodiment in which the peak offset ratio h/p is 0 or 1, which may be used for imaging purposes where, as can be seen, a family of rays 130 incident on one face 131 of an element 132 are reflected at orthogonal interfaces 133 to be transmitted through inclined interfaces 134 and refracted again at a plane major face 135 of the second element 136 which is identical in form to the element 132.

Figure 21:
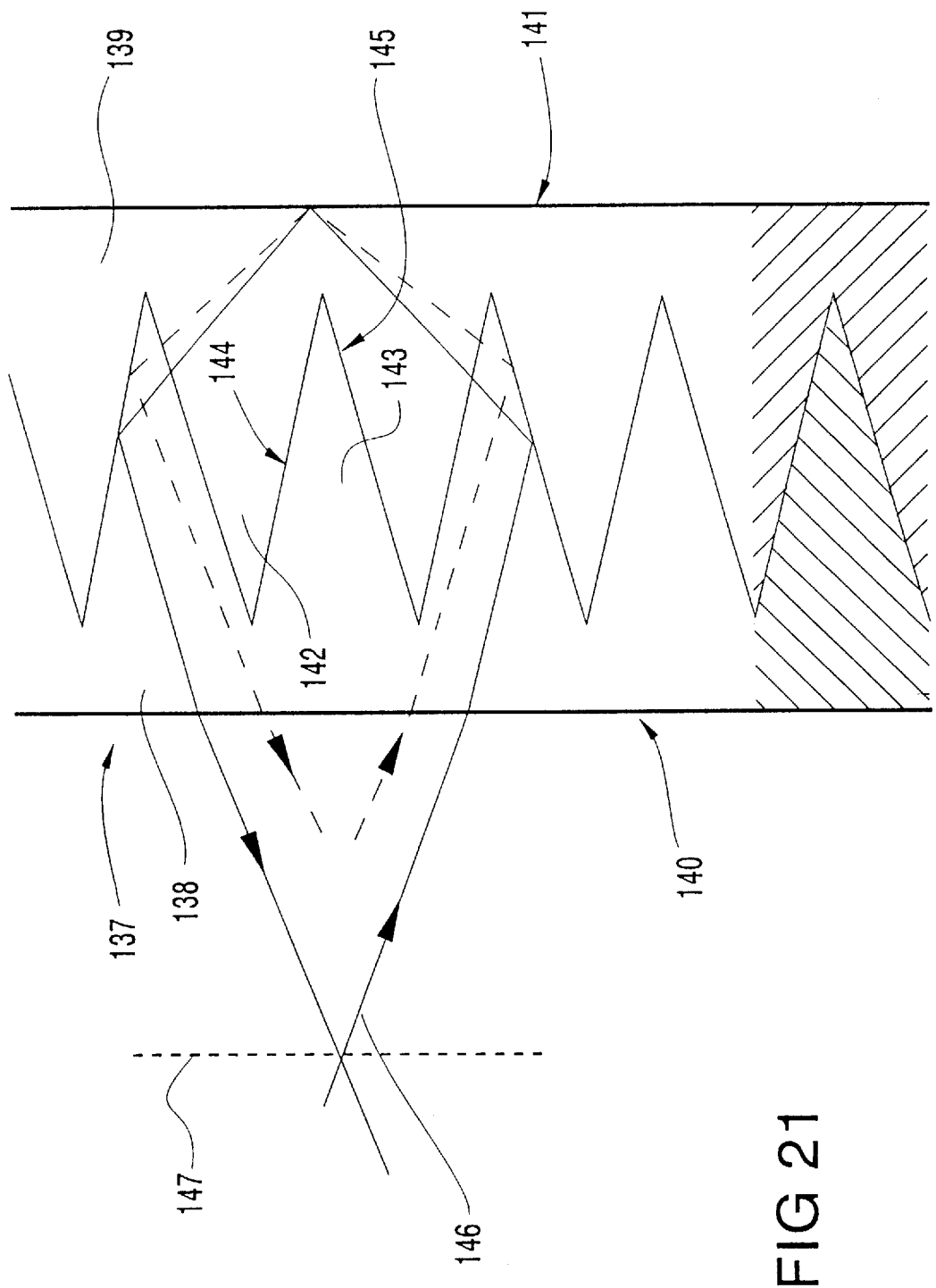
FIG. 21 is a sectional side view of another embodiment having symmetrical elementary surfaces, but in which the aspect ratio is different leading to different optical properties.

In the embodiment of FIG. 21 is shown another arrangement in which the component 137 comprises two elements 138, 139 which have plane major faces 140, 141 and symmetrical ribs 142, 143 separated by symmetrical and correspondingly shaped grooves, (not referenced) in a form such that the ribs 142, 143 interpenetrate one another and both symmetrically inclined faces are in contact to define interfaces 144, 145. The aspect ratio in this embodiment is approximately 1.9 and the peak offset ratio is ½ (thereby defining a symmetrical configuration. For certain incident angles typified by the incident ray 146 the component acts as a plane reflector by multiple internal reflections, with a virtual reflection plane identified by the chain line 147. This reflection occurs only over a limited range of incident angles, however, and light is transmitted through the component 137 at angles of incidence outside this range. Such an embodiment may be useful for a part-time reflector where reflection or transmission can be achieved by varying the inclination of the component with respect to the observer, or by moving the observer's head with respect to a fixed component. Such a reflector may have value, for example, as a rear view mirror of extended width, suitable for a truck or for towing a caravan, where forward vision and rear view are both required from the same part of the field of view, and both can be achieved at will by the observer.

Figure 22:
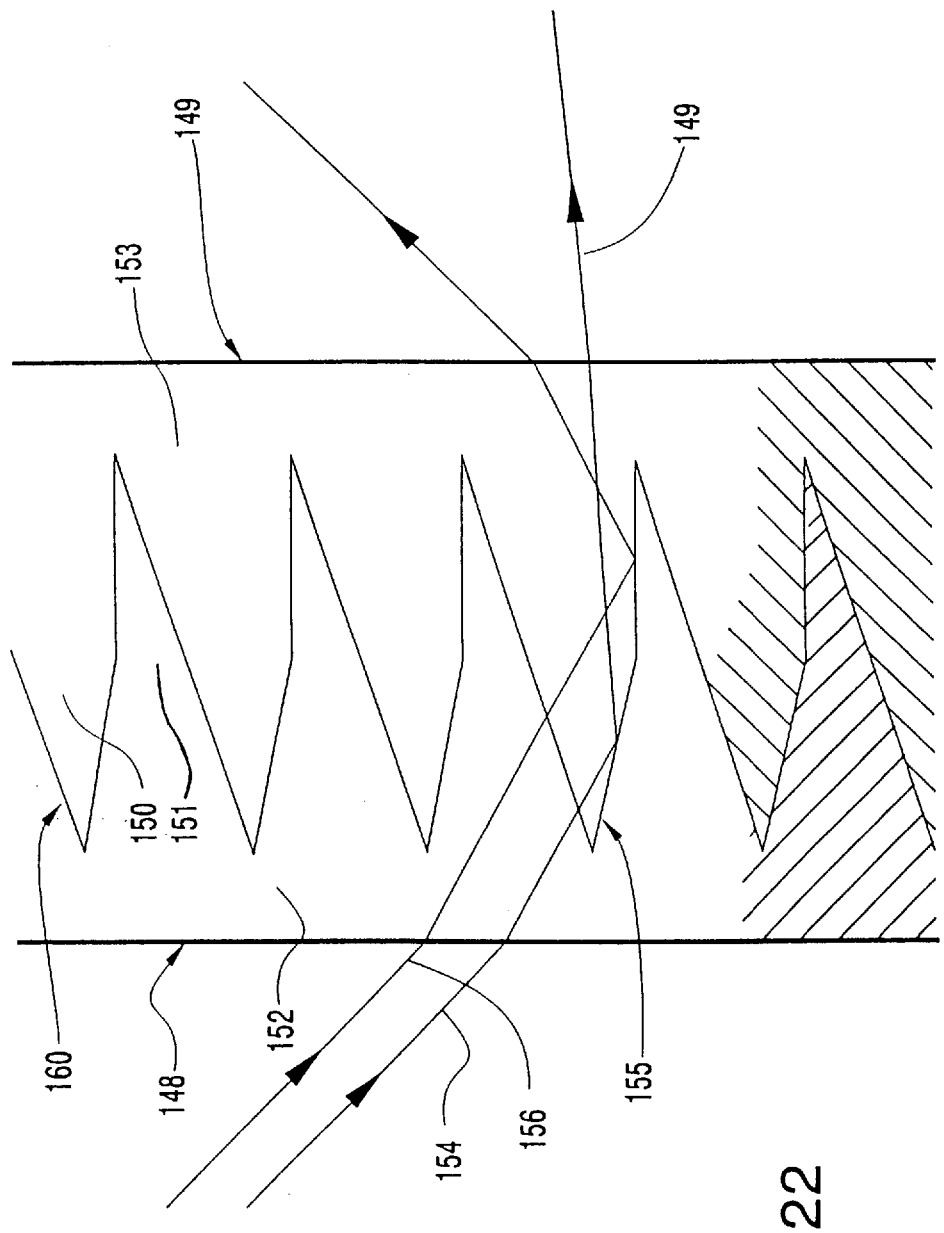
FIG. 22 is a sectional side view of an embodiment of the invention having a regular array of three elementary surfaces.

FIG. 22 illustrates another embodiment of the invention in which interpenetrating ribs of different but corresponding shape, identified by the reference numerals 150, 151 define a family of interfaces 160 parallel to one another and inclined to the major faces 148, 149 of respective optical components 152, 153. In this embodiment, as can be seen from FIG. 22, illumination at the same angle of incidence may be transmitted differently in dependence on its transverse position. Here the incident ray 154 strikes a first facet of the interface 155 to be transmitted approximately orthogonally of the major face 149 whereas an identically inclined incident ray 156 strikes a second facet of the interface 155 and is reflected at a sharper angle, and consequently refracted more steeply at the exit face 149. In this embodiment the thickness of material between the face 148 and the roots of the ribs 151 is greater.

Figure 23:
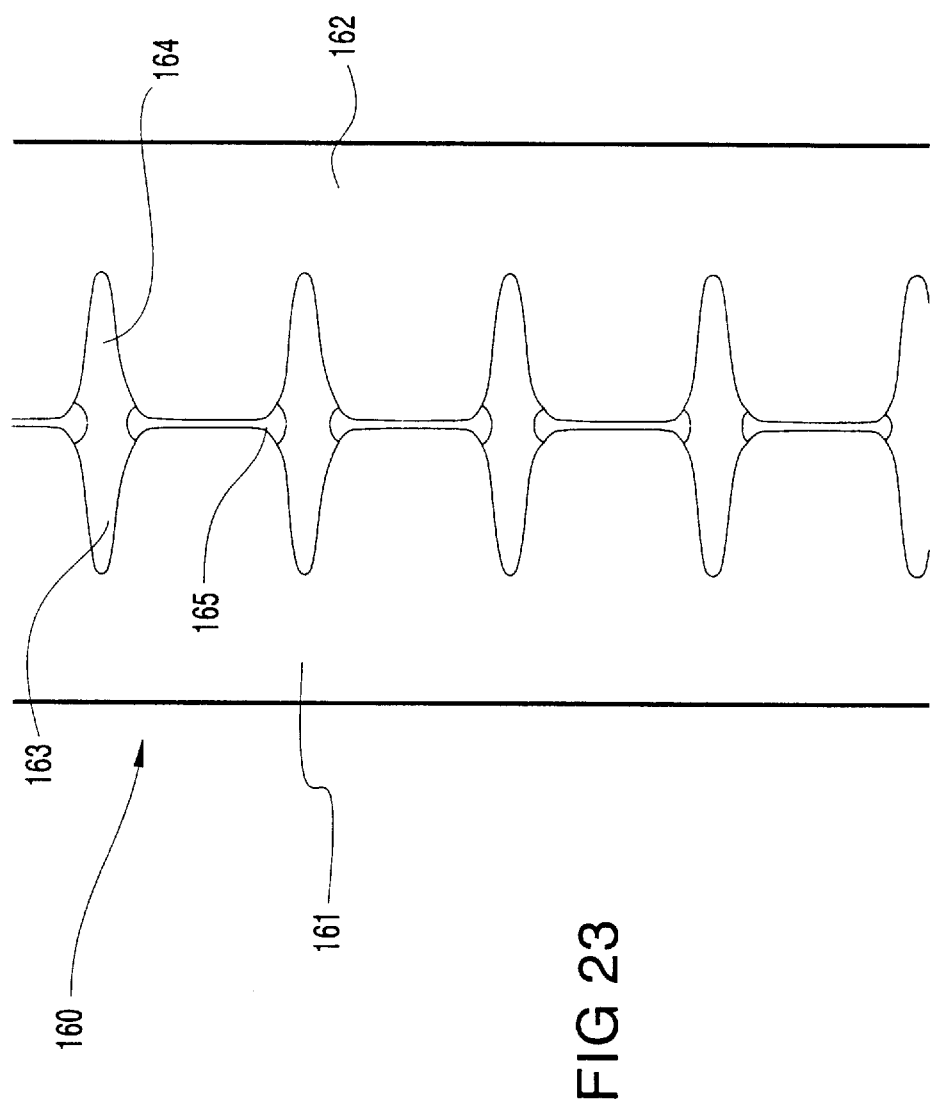
FIG. 23 is a sectional side view of an alternative embodiment formed using different materials and manufacturing techniques.

It is not essential for the ribs to penetrate the grooves and in the embodiment of FIG. 23 there is shown a component 160 comprising two identical elements 161, 162 having sets of inclined V-shaped grooves 163, 164 spaced from one another by a greater distance than the width of the groove. In this case the grooves may be typically of the order of 1 mm at their widest point, whilst the separation between adjacent grooves may be of the order of 2 or 3 mm. The facing surfaces of the elements 161, 162 are bonded by an adhesive 165 which preferably has the same refractive index as the material of the elements 161, 162 so that the composite element 160 effectively behaves as a monolithic body with trapezoidal voids defined by pairs of grooves 163, 164. Such a structure is typically suitable to be made in glass.

Figure 24:
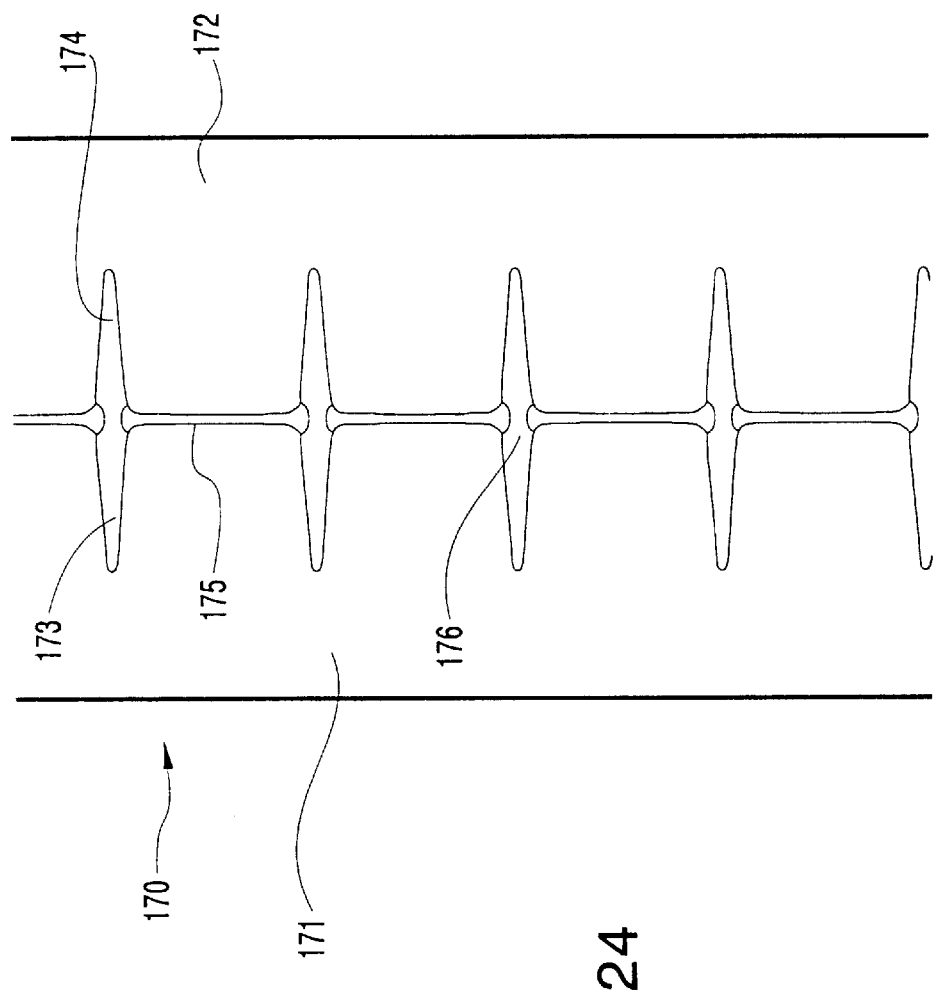
FIG. 24 is a sectional side view of a further embodiment made using techniques similar to those of the embodiment of FIG. 23.

Another embodiment, similar to that of FIG. 23, but having a different ratio of dimensions is illustrated in FIG. 24. Here the component 170 comprises two elements 171, 172 which are identical to one another and have respective V-section grooves 173, 174 in register with one another, the two elements 171, 172 being bonded by adhesive either between adjacent grooves as illustrated by the bonding element 175 or spanning the grooves as illustrated by the bonding element 176.

Figure 25:
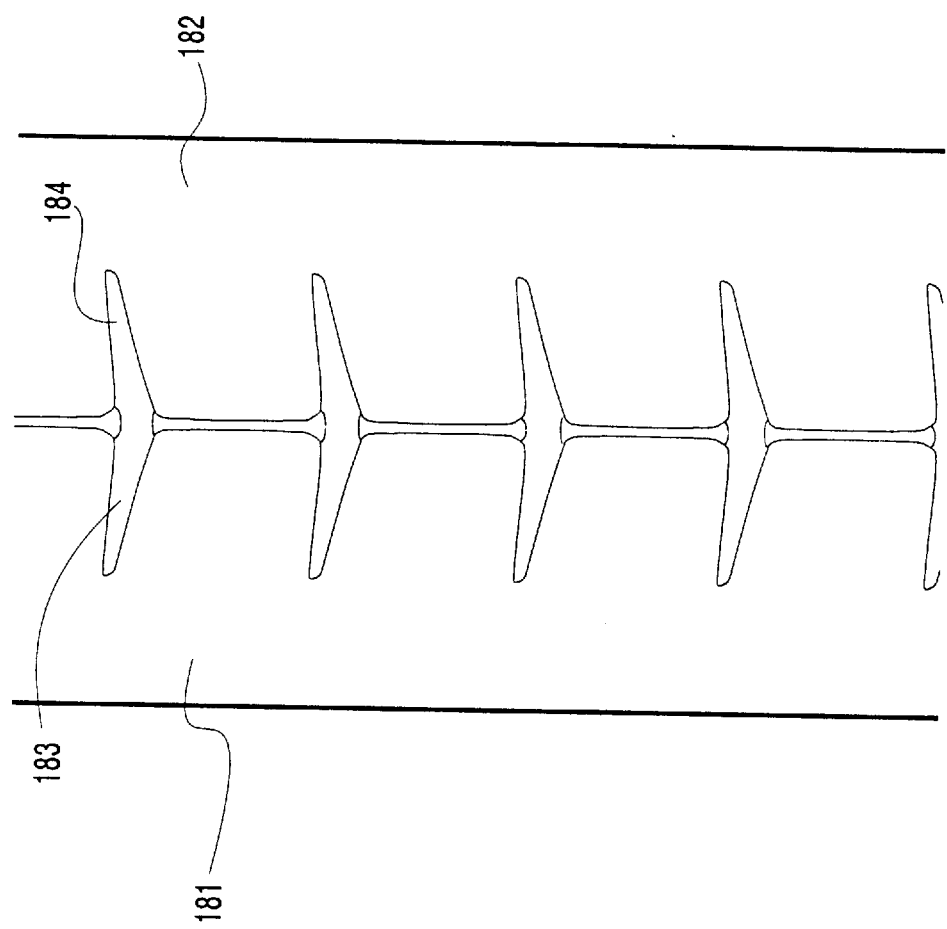
FIG. 25 is a sectional side view of a further embodiment having asymmetric elementary surfaces made using the techniques used for the embodiments of FIGS. 23 and 24.

In FIG. 25 the form of the elements 181, 182 is similar to that of the elements 171, 172 but the grooves 183, 184 are asymmetrical to provide improved daylighting performance.

A further embodiment illustrated in FIG. 26 shows how the grooves 193, 194 may be formed by pressing in metal or other formers 195 into the otherwise flat faces 196, 197 of planar sheets 198, 199 of glass. Because the formers 195 do not bond intimately with the surfaces of the glass, leaving a small air gap so that total internal reflection can take place, the formers 195 are effectively "invisible" since incident light which would otherwise be blocked by the opacity of the formers is reflected at the interface whereas light incident at a narrow range of angles about a direction orthogonal to the general plane of the component is transmitted through the component substantially unmodified.

Although in all of the embodiments illustrated the ribs and grooves of the elements are directed inwardly towards one another, and this is the preferred arrangement, it is nevertheless possible for embodiments to be formed in which the ribs and grooves of the two elements to face in the same direction as one another, for example inwardly of a building, or for the ribs and grooves to face away from one another.

I claim:

1. An optical component comprising two substantially planar elements each having a respective plurality of elementary surfaces which reflect by total internal reflection light incident thereon through the corresponding said element within a first range of incident angles associated with each said elementary surface, and which refract light incident thereon through the corresponding said element within a second range of incident angles associated with each said elementary surface, the configuration of the said elements being such that when the light from a range of directions is incident on the optical component a portion thereof is diverted by total internal reflection at the interfaces defined by the said elementary surfaces, and at least a portion thereof passes through said elements substantially undeviated wherein a substantially undistorted view through the optical component is obtained over at least a limited range of viewing angles.

2. The optical component of claim 1, wherein at least one said substantially planar element has first and second opposite major faces, a plurality of regular surface formations on said second major face defining said plurality of elementary surfaces, the said surface formations acting to divert light passing through the component by refraction and reflection into at least two different directions.

3. The optical component of claim 2 wherein the said elementary surfaces are substantially planar.

4. The optical component of claim 3, wherein some of the said elementary surfaces lie substantially orthogonal to the said first major face of the element, on which light is incident in use.

5. The optical component of claim 2, wherein the said elementary surfaces comprise a plurality of parallel grooves one of the faces of which defines an interface at which reflection occurs over the said predetermined range of angles of incident light.

6. The optical component of claim 5, wherein each said elementary surface is unsilvered and inclined to the said first major face of the component on which, in use, light is incident, at an angle such that total internal reflection occurs at the interface for light incident on the said first major face of the component within a predetermined range of angles.

7. The optical component of claim 5, wherein each said elementary surface is unsilvered and inclined to the said first major face of the component on which, in use, light is incident, at an angle such that total internal reflection occurs at the interface for light incident on the said first major face of the component within a predetermined range of angles.

8. The optical component of claim 2, wherein the said first and second opposite major faces each have at least a portion of their respective surface areas substantially parallel to one another.

9. The optical component of claim 2, wherein ore of said first and second opposite major faces is a substantially flat uninterrupted planar surface.

10. The optical component of claim 9, wherein there are further provided means for diverting a proportion of light incident on the said one major face in such a way that it travels away from the component on the same side thereof as the said one major face.

11. The optical component of claim 2, wherein facing major surfaces of the said two optical elements are in contact with one another.

12. The optical component of claim 11, wherein there are provided means for varying the physical configuration of the said surface formations of at least one said optical element, whereby to vary at least one of the directions and the proportion of refracted and reflected exit light.

13. The optical component of claim 11, wherein the said elementary surfaces of the optical elements interpenetrate one another.

14. The optical component of claim 2, wherein the surface formations thereof are directed towards one another and the surface formations of one optical element are off-set, parallel to the plane of the optical component, with respect to the surface formations of the other said optical element.

15. The optical component of claim 2, wherein both said substantially planar elements have surface formations directed towards one another and the surface formations of one optical element are in register, parallel to the plane of the optical component, with the surface formations of the other said optical element.

16. The optical component of claim 1, wherein the elementary surfaces are inclined at different angles at different parts of the said elements, such that, for a given angle of incidence, the angle of reflection is different at different points of incidence over the surface of the component.

17. The optical component of claim 3, wherein the inclination of the said elementary surfaces is greater nearer a lower edge of the said planar element in relation to a normal upright orientation of use, such that for a given angle of incidence, the angle of reflection is greater at points of incidence closer to the said lower edge of the component than at points of incidence further from the said lower edge.

18. The optical component of claim 1, wherein at least some of the said elementary surfaces are curved transverse their length.

19. The optical component of claim 18, wherein the curvatures of the said at least some of the said elementary surfaces are convex.

20. The optical component of claim 18, wherein the curvatures of the said at least some of the said elementary surfaces are concave.

21. The optical component of claim 1, wherein the said two optical elements are located between and respectively contacted by two rigid, substantially planar, transparent panels.

22. The optical component of claim 1, wherein there are further provided means for introducing a fluid of different refractive index from that of air into the interspace between the said two optical elements whereby to vary at least one of the direction and the proportion of refracted and reflected exit light.

23. The optical component of claim 1, wherein for light incident thereon at an angle within a predetermined range of incident angles, all of the light transmitted through the component travels in substantially the same directions as the incident light.

24. An optical component comprising:
 a first optically transparent body having two major faces a first of which is substantially uninterrupted and a second of which is interrupted by a plurality of cavities defined by first and second elementary surfaces,
 a second optically transparent body having two major faces a first of which is substantially uninterrupted and a second of which is interrupted by a plurality of cavities defined by first and second elementary surfaces,
 the said first and second optically transparent bodies being juxtaposed with their respective said second major faces facing one another and the first elementary surfaces of the cavities in the second major face of the first optically transparent body contacting the corresponding first elementary surfaces of the cavities in the second major face of the second optically transparent body wherein the said contacting first elementary surfaces of the cavities in the second major faces of both the first and second optically transparent bodies allow light incident thereon through the respective said optically transparent body at an angle of incidence with the said first elementary surfaces below a threshold angle to be transmitted therethrough to provide a view through the optical component and the second elementary surfaces art to reflect by total internal reflection light incident thereon through the associated said optically transparent body at an angle of incidence with the said second elementary surfaces above a threshold angle wherein to divert said light out of its incident direction, wherein said incident light passes substantially undeviated through said first and second optically transparent bodies.

25. The optical component of claim 24, wherein the elementary surfaces are inclined at different angles at different parts of the said optically transparent bodies such that, for a given angle of incidence, the angle of reflection is different at different points of incidence over the surface of the component.

26. The optical component of claim 24, wherein the inclination of the said elementary surfaces is greater nearer the lower edge of the said optically transparent body in relation to a normal upright orientation of use such that for a given angle of incidence, the angle of reflection is greater at points of incidence closer to the said lower edge of the body than at points of incidence further from the said lower edge.

27. The optical component of claim 24, wherein the said elementary surfaces are substantially planar.

28. The optical component of claim 24, wherein some of the said second elementary surfaces lie substantially orthogonal to the said first major face of the element, on which light is incident in use.

29. The optical component of claim 24, wherein at least some of the said elementary surfaces are curved transverse their length.

30. The optical component of claim 29, wherein the curvatures of the said at least some of the said elementary surfaces are convex.

31. The optical component of claim 29, wherein the curvatures of the said at least some of the said elementary surfaces are concave.

32. The optical component of claim 24, wherein the said cavities comprise a plurality of parallel grooves defined by respective pairs of first and second elementary surfaces inclined with respect to one another.

33. The optical component of claim 24, wherein each said elementary surface is unsilvered and inclined to the said first major face of the component on which, in use, light is incident, at an angle such that total internal reflection occurs at the interface for light incident on the said first major face of the component within a predetermined range of angles.

34. The optical component of claim 24, wherein the said first and second opposite major faces each have at least a portion of their respective surface areas substantially parallel to one another.

35. The optical component of claim 24, wherein there are further provided means for diverting a proportion of light incident on the said one major face in such a way that it travels away from the component on the same side thereof as the said one major face.

36. The optical component of claim 24, wherein the said two optical elements are located between and respectively contacted by two rigid, substantially planar, transparent panels.

37. The optical component of claim 24, wherein there are further provided means for introducing a fluid of different refractive index from that of air into the interspace between the said two optical elements whereby to vary the direction of refracted and or reflected exit light and/or the proportion of exit light traveling in each of the said two directions.

38. The optical component of claim 24, wherein there are provided means for varying the physical configuration of the said surface formations of the or each said optical element, whereby to vary the proportion of exit light traveling in each said direction.

39. The optical component of claim 24, wherein for light incident thereon at an angle within a predetermined range of incident angles, all of the light transmitted through the component travels in substantially the same directions as the incident light.

40. The optical component of claim 24, wherein the elementary surfaces of one optical element are off-set, parallel to the plane of the optical component, with respect to the elementary surfaces of the other said optical element.

41. The optical component of claim 24, wherein the elementary surfaces of one optical element are in register, parallel to the plane of the optical component, with the elementary surfaces of the other said optical element.

42. An optical component of claim 24, wherein the dimensions of and separation between the elementary surfaces are not substantially larger than about the pupil of the human eye (1 mm) and not smaller than that at which diffraction effects predominate (about several micrometers).

* * * * *

UNITED STATES PATENT AND TRADEMARK OFFICE
CERTIFICATE OF CORRECTION

PATENT NO. : 5,880,886

DATED : March 9, 1999

INVENTOR(S) : Peter James Milner

It is certified that error appears in the above-indentified patent and that said Letters Patent is hereby corrected as shown below:

Column 4, line 62, delete "6" and insert --3--.
Column 5, lines 5-6, delete "surface features ...embodiments" and insert --spacing between two elements produces a "sun blind" effect--.
Column 5, lines 11-12, delete "utilising partly silvered reflectors" and insert --producing a "sun blind" effect and vision through the window at horizontal or near horizontal angles--.
Column 5, lines 14-15, delete "an expanded...explanation" and insert --a view of an embodiment such as that of Figure 10 illustrating the path of light at 45° elevation--.
Column 6, line 24, delete "facetted" and insert --faceted--.
Column 7, line 17, delete "embodiments" and insert --embodiment--.
Column 7, line 17, delete "FIGS. 2 and 3" and insert --FIG. 3 --.
Column 7, line 20, delete "embodments" and insert --embodiment--.
Column 7, line 20, delete "FIGS. 2 and 3" and insert --FIG. 3--.
Column 7, line 21, delete "FIG. 2" and insert --FIG. 3--.
Column 7, line 24, delete "FIGS. 2 and 3" and insert --FIG. 3--.
Column 7, line 35, delete "sealing" and insert --ceiling--.
Column 7, line 45, delete "FIG. 2" and insert --FIG. 3--.
Column 7, line 53, delete "FIG. 7" and insert --FIG. 5--.
Column 7, line 56, delete "FIG. 8" and insert --FIG. 6--.
Column 8, line 25, delete "glair" and insert --glare--.
Column 8, line 48, delete "FIG. 11" and insert --FIG. 9--.
Column 8, line 56, delete "FIG. 11a" and insert --FIG. 9--.
Column 8, line 60, delete "FIG. 11a" and insert --FIG. 9a--.
Column 9, line 44, delete "17" and insert --70-73--.
Column 10, line 14, delete "FIG. 16" and insert --FIG. 14--.
Column 10, line 32, delete "70" and insert --76--.
Column 10, line 59, delete "namely", second occurrence, and insert --,--.
Column 10, line 65, delete "FIG. 1" and insert --FIG. 15--.

UNITED STATES PATENT AND TRADEMARK OFFICE
CERTIFICATE OF CORRECTION

PATENT NO. : 5,880,886
DATED : March 9, 1999
INVENTOR(S) : Peter James Milner

It is certified that error appears in the above-indentified patent and that said Letters Patent is hereby corrected as shown below:

Column 11, line 12, delete "ribs" and insert --rib--.
Column 11, line 13, delete "faces" and insert --face--.
Column 11, line 48, delete "FIG. 1" and insert --FIG. 15--.
Column 11, line 56, delete "FIG. 3" and insert --FIG. 16--.
Column 12, line 33, delete "of" and insert --is--.

Signed and Sealed this

Twenty-eighth Day of September, 1999

Attest:

Attesting Officer

Q. TODD DICKINSON

Acting Commissioner of Patents and Trademarks